United States Patent
Chendamarai Kannan et al.

(10) Patent No.: US 10,849,131 B2
(45) Date of Patent: Nov. 24, 2020

(54) BURSTY INTERFERENCE MITIGATION TECHNIQUES

(71) Applicant: QUALCOMM Incorporated, San Diego, CA (US)

(72) Inventors: Arumugam Chendamarai Kannan, San Diego, CA (US); Vinay Chande, San Diego, CA (US); Sanaz Barghi, Carlsbad, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/248,596

(22) Filed: Jan. 15, 2019

(65) Prior Publication Data
US 2019/0261378 A1 Aug. 22, 2019

Related U.S. Application Data

(60) Provisional application No. 62/710,487, filed on Feb. 16, 2018.

(51) Int. Cl.
*H04W 72/08* (2009.01)
*H04L 5/00* (2006.01)
(Continued)

(52) U.S. Cl.
CPC ........ *H04W 72/082* (2013.01); *H04B 7/0632* (2013.01); *H04B 7/0695* (2013.01);
(Continued)

(58) Field of Classification Search
CPC .... H04B 7/0695; H04B 7/0617; H04B 7/088; H04B 7/0417; H04B 7/06; H04B 7/0632; H04B 7/066; H04L 25/0202
See application file for complete search history.

(56) References Cited

U.S. PATENT DOCUMENTS

| | | | |
|---|---|---|---|
| 2006/0233131 A1 | 10/2006 | Gore et al. | |
| 2010/0273499 A1* | 10/2010 | van Rensburg | H04W 16/28 455/450 |

(Continued)

FOREIGN PATENT DOCUMENTS

| | | |
|---|---|---|
| CN | 1407746 A | 4/2003 |
| CN | 1407816 A | 4/2003 |
| WO | WO-2017083489 A1 | 5/2017 |

OTHER PUBLICATIONS

International Search Report and Written Opinion—PCT/US2019/013820—ISA/EPO—dated May 22, 2019 (182244WO).

*Primary Examiner* — Wutchung Chu
(74) *Attorney, Agent, or Firm* — Robert A. Reid; Holland & Hart LLP

(57) ABSTRACT

Methods, systems, and devices for wireless communications are described. A wireless device may select a transmission beam sequence for a wireless device during a plurality of transmission slots. The transmission beam sequence may indicate a transmission beam that the wireless device will use for its transmissions during a corresponding transmission slot. The wireless device may transmit a broadcast control signal including an indication of the transmission beam sequence. The wireless device may perform wireless transmissions over the plurality of transmission slots according to the transmission beam sequence. Other wireless devices may use the transmission beam sequence to schedule their own transmissions during the plurality of transmission slots.

24 Claims, 16 Drawing Sheets

(51) Int. Cl.
  *H04W 72/00* (2009.01)
  *H04W 72/04* (2009.01)
  *H04W 72/14* (2009.01)
  *H04L 1/18* (2006.01)
  *H04B 7/06* (2006.01)
  *H04L 1/00* (2006.01)

(52) U.S. Cl.
  CPC .......... *H04L 1/0026* (2013.01); *H04L 1/1812* (2013.01); *H04L 1/1896* (2013.01); *H04L 5/0055* (2013.01); *H04L 5/0057* (2013.01); *H04W 72/005* (2013.01); *H04W 72/046* (2013.01); *H04W 72/0446* (2013.01); *H04W 72/14* (2013.01)

(56) References Cited

U.S. PATENT DOCUMENTS

| | | | | |
|---|---|---|---|---|
| 2011/0249643 A1* | 10/2011 | Barbieri | ................ | H04L 1/0028 370/329 |
| 2013/0308479 A1* | 11/2013 | Schober | ................ | H04L 1/0034 370/252 |
| 2013/0322276 A1 | 12/2013 | Pelletier et al. | | |
| 2013/0331081 A1* | 12/2013 | Rune | ................ | H04W 52/0229 455/418 |
| 2015/0139009 A1 | 5/2015 | Park et al. | | |
| 2015/0304868 A1* | 10/2015 | Yu | ................ | H04B 7/0617 370/312 |
| 2016/0157118 A1* | 6/2016 | Liu | ................ | H04L 1/203 370/252 |
| 2016/0353467 A1* | 12/2016 | Nekovee | ................ | H04B 7/0408 |
| 2016/0360463 A1* | 12/2016 | Kim | ................ | H04W 36/30 |
| 2016/0373180 A1 | 12/2016 | Guo et al. | | |
| 2017/0141894 A1* | 5/2017 | Wei | ................ | H04B 17/309 |
| 2018/0205440 A1* | 7/2018 | Enescu | ................ | H04B 7/0695 |
| 2018/0287860 A1* | 10/2018 | Xia | ................ | H04W 72/046 |
| 2018/0338254 A1* | 11/2018 | Ho | ................ | H04B 7/0632 |
| 2019/0199496 A1* | 6/2019 | Qin | ................ | H04B 7/063 |
| 2019/0207656 A1* | 7/2019 | Hlander | ................ | H04L 5/0048 |
| 2019/0223155 A1* | 7/2019 | Lu | ................ | H04L 5/0032 |
| 2019/0342872 A1* | 11/2019 | Rune | ................ | H04L 5/0091 |
| 2019/0386757 A1* | 12/2019 | Li | ................ | H04B 7/0626 |
| 2019/0394757 A1* | 12/2019 | Zhang | ................ | H04B 7/0456 |
| 2020/0045709 A1* | 2/2020 | Seo | ................ | H04W 56/001 |
| 2020/0059290 A1* | 2/2020 | Pan | ................ | H04B 7/088 |

\* cited by examiner

BURSTY INTERFERENCE MITIGATION TECHNIQUES

CROSS REFERENCE

The present Application for Patent claims the benefit of U.S. Provisional Patent Application No. 62/710,487 by CHENDAMARAI KANNAN, et al., entitled "BURSTY INTERFERENCE MITIGATION TECHNIQUES," filed Feb. 16, 2018, assigned to the assignee hereof, and expressly incorporated by reference herein in its entirety.

BACKGROUND

The following relates generally to wireless communication, and more specifically to bursty interference mitigation techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless device may include a plurality of antennas. The wireless device may be capable of transmitting one a number of different beams corresponding to different antenna configurations, which may enable the wireless device to transmit in a directional manner. Such beamforming techniques may allow the wireless device to improve signal quality by avoiding or minimizing interference from transmissions originating from directions other than the direction in which the wireless device is oriented.

SUMMARY

The described techniques relate to improved methods, systems, devices, or apparatuses that support bursty interference mitigation techniques. Generally, the described techniques provide for mitigating the effects of changing interference caused by the use of different transmission beams. A wireless device may select a transmission beam sequence for a wireless device during a plurality of transmission slots. The transmission beam sequence may indicate a transmission beam that the wireless device will use for its transmissions during a corresponding transmission slot. The wireless device may transmit a broadcast control signal including an indication of the transmission beam sequence. The wireless device may perform wireless transmissions over the plurality of transmission slots according to the transmission beam sequence. Other wireless devices may use the transmission beam sequence to schedule their own transmissions during the plurality of transmission slots.

A method of wireless communication is described. The method may include selecting, by a wireless device, a transmission beam sequence for a wireless channel during a plurality of transmission slots, transmitting a broadcast control signal including an indication of the transmission beam sequence for the wireless channel, and performing wireless transmissions over the plurality of transmission slots according to the transmission beam sequence.

An apparatus for wireless communication is described. The apparatus may include means for selecting, by a wireless device, a transmission beam sequence for a wireless channel during a plurality of transmission slots, means for transmitting a broadcast control signal including an indication of the transmission beam sequence for the wireless channel, and means for performing wireless transmissions over the plurality of transmission slots according to the transmission beam sequence.

Another apparatus for wireless communication is described. The apparatus may include a processor, memory in electronic communication with the processor, and instructions stored in the memory. The instructions may be operable to cause the processor to select, by a wireless device, a transmission beam sequence for a wireless channel during a plurality of transmission slots, transmit a broadcast control signal including an indication of the transmission beam sequence for the wireless channel, and perform wireless transmissions over the plurality of transmission slots according to the transmission beam sequence.

A non-transitory computer-readable medium for wireless communication is described. The non-transitory computer-readable medium may include instructions operable to cause a processor to select, by a wireless device, a transmission beam sequence for a wireless channel during a plurality of transmission slots, transmit a broadcast control signal including an indication of the transmission beam sequence for the wireless channel, and perform wireless transmissions over the plurality of transmission slots according to the transmission beam sequence.

Some examples of the method, apparatus, and non-transitory computer-readable medium described above may further include processes, features, means, or instructions for transmitting a reference signal over the wireless channel during one of the transmission slots based at least in part on the transmission beam sequence.

Some examples of the method, apparatus, and non-transitory computer-readable medium described above may further include processes, features, means, or instructions for receiving a beam-specific measurement report for the wireless channel based at least in part on the reference signal and the transmission beam sequence.

In some examples of the method, apparatus, and non-transitory computer-readable medium described above, the beam-specific measurement report may include an indication of interference on a first transmission beam.

In some examples of the method, apparatus, and non-transitory computer-readable medium described above, the indication of interference on the transmission beam may include a clean tag.

Some examples of the method, apparatus, and non-transitory computer-readable medium described above may further include processes, features, means, or instructions for selecting a second beam sequence based at least in part on the indication of interference on the transmission beam.

Some examples of the method, apparatus, and non-transitory computer-readable medium described above may further include processes, features, means, or instructions for performing a first outer loop link adaptation procedure corresponding to a first state of the indication. Some examples of the method, apparatus, and non-transitory computer-readable medium described above may further include processes, features, means, or instructions for performing a second outer loop link adaptation procedure corresponding to a second state of the indication.

Some examples of the method, apparatus, and non-transitory computer-readable medium described above may further include processes, features, means, or instructions for performing a first rank adaptation procedure corresponding to a first state of the indication. Some examples of the method, apparatus, and non-transitory computer-readable medium described above may further include processes, features, means, or instructions for performing a second rank adaptation procedure corresponding to a second state of the indication.

Some examples of the method, apparatus, and non-transitory computer-readable medium described above may further include processes, features, means, or instructions for receiving a negative acknowledgement (NACK) corresponding to the reference signal. Some examples of the method, apparatus, and non-transitory computer-readable medium described above may further include processes, features, means, or instructions for freezing an outer loop link adaptation procedure based at least in part on receiving the NACK.

Some examples of the method, apparatus, and non-transitory computer-readable medium described above may further include processes, features, means, or instructions for receiving a negative acknowledgement (NACK) corresponding to the reference signal. Some examples of the method, apparatus, and non-transitory computer-readable medium described above may further include processes, features, means, or instructions for freezing a rank adaptation procedure based at least in part on receiving the NACK.

In some examples of the method, apparatus, and non-transitory computer-readable medium described above, the transmission beam sequence may include an indication of a transmission beam to be used in each of the plurality of transmission slots.

In some examples of the method, apparatus, and non-transitory computer-readable medium described above, the indication of the transmission beam may include a beam index for the transmission beam.

In some examples of the method, apparatus, and non-transitory computer-readable medium described above, the indication of the transmission beam may include a closest synchronization signal block index to the transmission beam.

In some examples of the method, apparatus, and non-transitory computer-readable medium described above, the broadcast control signal may be transmitted after a first plurality of slots of the plurality of transmission slots and before a second plurality of slots of the plurality of transmission slots.

In some examples of the method, apparatus, and non-transitory computer-readable medium described above, the broadcast control signal may be transmitted on a group common physical downlink control channel (GC PDCCH).

In some examples of the method, apparatus, and non-transitory computer-readable medium described above, selecting the transmission beam sequence may include: selecting a first transmission beam. Some examples of the method, apparatus, and non-transitory computer-readable medium described above may further include processes, features, means, or instructions for scheduling transmissions on the first transmission beam for at least a threshold number of consecutive transmission slots of the plurality of transmission slots.

Some examples of the method, apparatus, and non-transitory computer-readable medium described above may further include processes, features, means, or instructions for determining that the wireless channel may be a minimum dwell channel, where transmissions may be scheduled on the first transmission beam for at least the threshold number of consecutive transmission slots of the plurality of transmission slots based at least in part on the determining.

In some examples of the method, apparatus, and non-transitory computer-readable medium described above, scheduling transmissions on the first transmission beam for at least the threshold number of consecutive transmission slots may include: refraining from scheduling any transmissions on the wireless channel during one of the at least the threshold number of consecutive transmission slots.

Some examples of the method, apparatus, and non-transitory computer-readable medium described above may further include processes, features, means, or instructions for selecting a modulation and coding scheme (MCS) based at least in part on the scheduling transmissions on the first transmission beam for at least the threshold number of consecutive transmission slots.

In some examples of the method, apparatus, and non-transitory computer-readable medium described above, selecting the transmission beam sequence may include: scheduling a first wireless transmission on a first transmission beam during a first transmission slot of the plurality of transmission slots. Some examples of the method, apparatus, and non-transitory computer-readable medium described above may further include processes, features, means, or instructions for refraining from scheduling additional transmissions on the first transmission beam for at least a threshold number of slots after the first transmission slot.

Some examples of the method, apparatus, and non-transitory computer-readable medium described above may further include processes, features, means, or instructions for determining that the wireless channel may be a minimum revisit channel, where the additional transmissions may be refrained from being scheduled on the first transmission beam for at least the threshold number of slots after the first transmission slot based at least in part on the determining.

A method of wireless communication is described. The method may include receiving over a wireless channel a broadcast control signal including an indication of a transmission beam sequence for the wireless channel during a plurality of transmission slots, receiving a reference signal during one of the plurality of transmission slots, and transmitting a beam-specific measurement report to a base station based at least in part on the received reference signal and the transmission beam sequence.

An apparatus for wireless communication is described. The apparatus may include means for receiving over a wireless channel a broadcast control signal including an indication of a transmission beam sequence for the wireless channel during a plurality of transmission slots, means for receiving a reference signal during one of the plurality of transmission slots, and means for transmitting a beam-specific measurement report to a base station based at least in part on the received reference signal and the transmission beam sequence.

Another apparatus for wireless communication is described. The apparatus may include a processor, memory in electronic communication with the processor, and instructions stored in the memory. The instructions may be operable to cause the processor to receive over a wireless channel a broadcast control signal including an indication of a transmission beam sequence for the wireless channel during a plurality of transmission slots, receive a reference signal during one of the plurality of transmission slots, and transmit a beam-specific measurement report to a base station based at least in part on the received reference signal and the transmission beam sequence.

A non-transitory computer-readable medium for wireless communication is described. The non-transitory computer-readable medium may include instructions operable to cause a processor to receive over a wireless channel a broadcast control signal including an indication of a transmission beam sequence for the wireless channel during a plurality of transmission slots, receive a reference signal during one of the plurality of transmission slots, and transmit a beam-specific measurement report to a base station based at least in part on the received reference signal and the transmission beam sequence.

In some examples of the method, apparatus, and non-transitory computer-readable medium described above, the beam-specific measurement report may include a reported channel quality indicator (CQI) for a transmission beam corresponding to the reference signal.

Some examples of the method, apparatus, and non-transitory computer-readable medium described above may further include processes, features, means, or instructions for determining a current CQI for the transmission beam. Some examples of the method, apparatus, and non-transitory computer-readable medium described above may further include processes, features, means, or instructions for determining one or more previous CQIs for the transmission beam. Some examples of the method, apparatus, and non-transitory computer-readable medium described above may further include processes, features, means, or instructions for calculating an average CQI for the transmission beam based at least in part on the current CQI and the one or more previous CQIs, where the average CQI may be used as the reported CQI.

Some examples of the method, apparatus, and non-transitory computer-readable medium described above may further include processes, features, means, or instructions for determining a classification of an interference state of the reported CQI, where the beam-specific measurement report may include the classification of the interference state.

In some examples of the method, apparatus, and non-transitory computer-readable medium described above, the classification may be one of a clean CQI and an unclean CQI.

Some examples of the method, apparatus, and non-transitory computer-readable medium described above may further include processes, features, means, or instructions for transmitting a negative acknowledgement (NACK) based at least in part on determining that the reference signal was not received, where the NACK may include the classification.

Some examples of the method, apparatus, and non-transitory computer-readable medium described above may further include processes, features, means, or instructions for determining, based at least in part on the indication of the transmission beam sequence, that wireless transmissions may be scheduled on a first transmission beam for a number of consecutive transmission slots. Some examples of the method, apparatus, and non-transitory computer-readable medium described above may further include processes, features, means, or instructions for filtering channel state information over the number of consecutive transmission slots.

DETAILED DESCRIPTION

Figure 1:
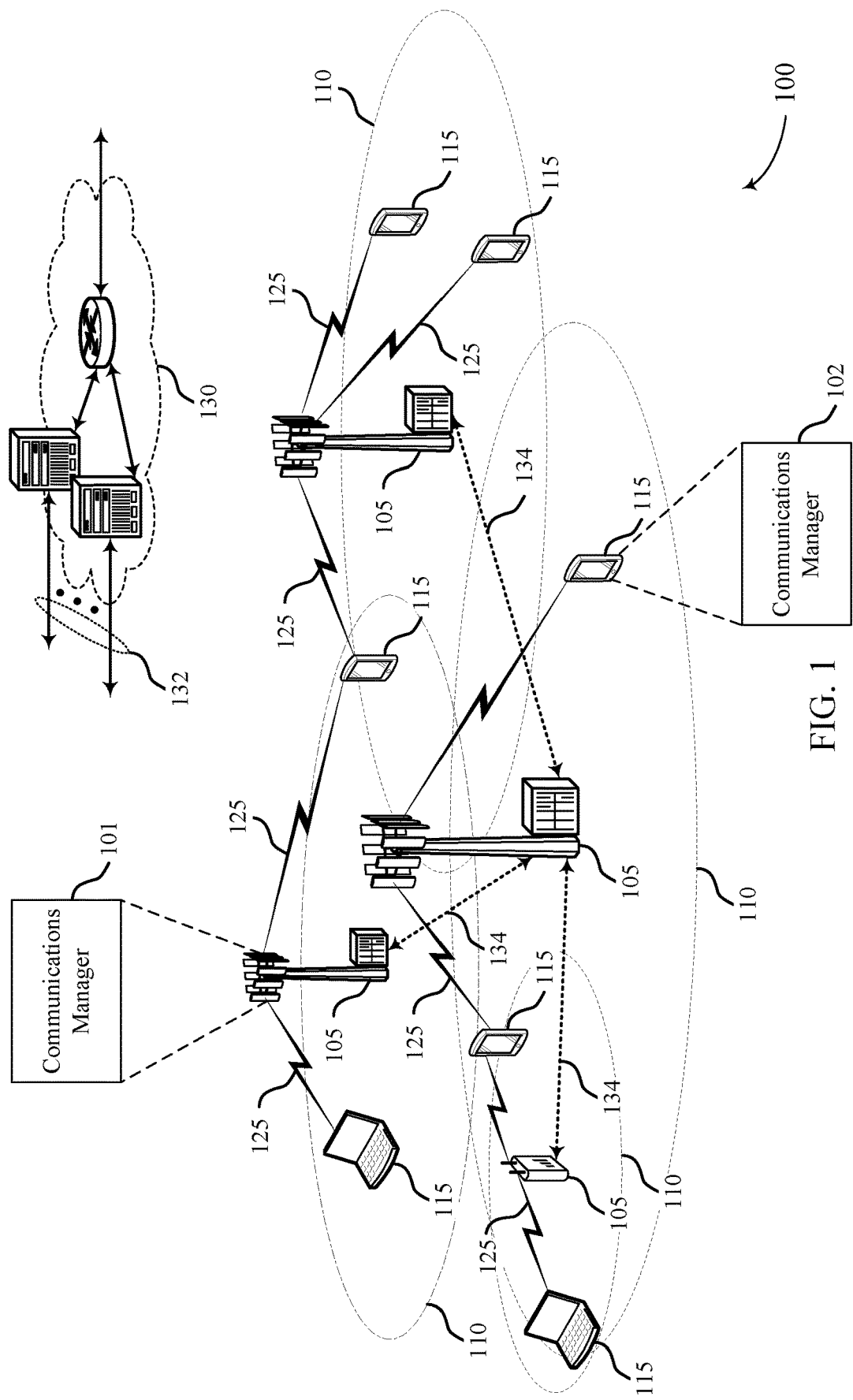
FIG. 1 illustrates an example of a system for wireless communication that supports bursty interference mitigation techniques in accordance with aspects of the present disclosure.

The use of beamforming techniques may allow a wireless device to improve signal quality by avoiding or minimizing interference from transmissions originating from directions other than the direction in which the wireless device is oriented. However, transmitting using a number of different beams may also cause other wireless devices to experience highly bursty interference, that is, interference that is transitional in nature. For example, a first base station may transmit using a first directional beam and a second directional beam. A user equipment (UE) served by a second base station may experience different interference conditions based on which beam the first base station uses. For example, when the first base station is transmitting using the first directional beam, the UE may experience strong interference. When the first base station is transmitting using the second directional beam, the UE may experience low interference.

The transitional nature of the interference (which can vary from high to low when the first base station is transmitting) may impact the operation of the UE. For example, a channel state information-reference signal (CSI-RS) may be sent prior to the transmission of data. The modulation and coding scheme (MCS) applied to the data may be determined based on the CSI-RS. The CSI-RS may be observed in low interference conditions (e.g., when the first base station is transmitting using the second directional beam), but the data may be sent in high interference conditions (e.g., when the first base station is transmitting using the first directional beam). In such a case, the MCS may be overestimated, because a lower MCS should have been used. If, on the other hand, the CSI-RS is observed in high interference conditions, but the data is sent in low interference conditions, the MCS may be underestimated, because a higher MCS should have been used. In addition, when a mismatch occurs, an outer loop link adaptation procedure at the first base station may get de-stabilized, which may drive down performance even further. In some examples, the first base station may receive beam-specific measurement reports from the UE, and may attempt to avoid scheduling beams that cause high interference according to a channel quality indicator (CQI) tag in the measurement report.

In order to mitigate the effects of the transient interference, a wireless device may apply one or more mitigation techniques. In some examples, the wireless device may select a transmission beam sequence for a wireless transmission during a plurality of transmission slots. The transmission beam sequence may indicate the transmission beams to be used for transmissions during the plurality of transmission slots. The wireless device may transmit a broadcast control signal including an indication of the transmission beam sequence (e.g., beam indices for transmissions beams to be used during corresponding transmission slots). The wireless device may perform wireless transmissions over the plurality of transmission slots according to the transmission beam sequence. An interfered wireless device may experience bursty interference, but may be able to mitigate the effects thereof by knowing which transmission beam is being used during particular transmission slots.

In some examples, the wireless device may select a transmission beam sequence based at least in part on a minimum dwell time. In such examples, the wireless device may select a transmission beam to be used for a first transmission slot. Once the wireless device selects the transmission beam, the wireless device may stay on the transmission beam for at least a minimum dwell time (e.g., K slots). After the minimum dwell time (e.g., K slots), the wireless device may select a different transmission beam. The interference experienced by the interfered wireless device may be more constant, such that the interfered wireless device may adjust. For example, the likelihood that a reference signal and the corresponding data will be sent in different interference conditions may be decreased.

In some examples, the wireless device may select a transmission beam sequence based at least in part on a minimum beam revisit time. In such examples, the wireless device may select a first transmission beam to be used for a first transmission slot. The wireless device may continue to select the first transmission beam for one or more transmission slots immediately after the first transmission slot. However, once the wireless device leaves the first transmission beam, the wireless device may refrain from selecting the first transmission beam for at least a minimum beam revisit duration (e.g., K slots on a certain beam direction and/or to a UE). After the minimum beam revisit time (K slots), the wireless device may return to the first transmission beam. The interference experienced by the wireless device may still be somewhat transient. However, in a system with a small number of dominant jammers (e.g., where the interfered wireless device experiences strong interference only when the wireless devices transmit using a first transmission beam), the interfered wireless device may experience the dominant jammer as a short-lived outlier.

Aspects of the disclosure are initially described in the context of a wireless communications system. Aspects of the disclosure are further illustrated by and described with reference to apparatus diagrams, system diagrams, and flowcharts that relate to bursty interference mitigation techniques.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a communications manager 101, which may implement one or more techniques to mitigate the effects of bursty interference. The communications manager 101 may select a transmission beam sequence for a wireless channel during a plurality of transmission slots. The transmission beam sequence may be a correspondence between the plurality of transmission slots and a transmission beam to be used for transmissions during each of the plurality of transmission slots. In some examples, the transmission beam sequence may be selected based at least in part on a minimum dwell time or a minimum beam revisit duration.

The communications manager 101 may cause the base station 105 to transmit a broadcast control signal. The broadcast control signal may include an indication of the transmission beam sequence for the wireless channel. In some examples, the broadcast control signal may include a beam index for the transmission beam to be used during each of the plurality of transmission slots. In some other examples, the broadcast control signal may include a closest synchronization signal block (SSB) index for the transmission beam to be used during each of the plurality of transmission slots. The broadcast control signal may be transmitted over a group common physical downlink control channel (GC PDCCH).

The communications manager 101 may cause the base station 105 to perform wireless transmissions over the plurality of transmission slots in accordance with the transmission beam sequence. In some examples, the communications manager 101 may cause the base station 105 to transmit a reference signal during one or more of the plurality of transmission slots. The reference signal may be, for example, a channel state information-reference signal (CSI-RS).

The communications manager 101 may process a beam-specific measurement report received by the base station 105. In some examples, the beam-specific measurement report may include a tagged channel quality indicator (CQI), which may be tagged as either clean or unclean. The communications manager 101 may schedule additional transmissions based at least in part on the tagged CQI. For example, the communications manager 101 may schedule transmissions on beams tagged as clean, and may fall back on beams tagged as unclean when the transmissions on the clean beams fail. In some other examples, the communications manager 101 may run dual outer loop link adaptation procedures, with a first outer loop link adaptation procedure corresponding to clean CQIs and a second outer loop link adaptation procedure corresponding to unclean CQIs. The outer loop link adaptation procedures may be rank adaptation procedures, such that the communications manager 101 may perform a first rank adaptation procedure corresponding to clean CQIs and a second rank adaptation procedure corresponding to unclean CQIs.

UEs 115 may include a communications manager 102, which may configure a beam-specific measurement report. The communications manager 102 may process a reference signal received by the UE 115. The reference signal may be a CSI-RS. The communications manager 102 may determine a beam used to transmit the reference signal based at least in part on a transmission beam sequence indicated in a broadcast control signal. The communications manager 102 may calculate a reporting CQI based at least in part on the reference signal. For example, the communications manager 102 may calculate a current CQI based on the reference signal, and may use the current CQI as the reporting CQI. In some other examples, the communications manager 102 may determine one or more previous CQIs for the transmission beam used to transmit the reference signal. The communications manager 102 may calculate an average CQI based at least in part on the current CQI and the one or more previous CQIs.

In some examples, interference may be bimodal, such that an interfered node (e.g., the UE 115) may experience either strong interference (e.g., when a beam associated with an interfering device is colliding with a transmit beam) or weak interference (e.g., when there is little or no beam collision). The communications manager 102 may classify the CQI conditions as either good (clean) or bad (unclean). For example, the UE 115 may classify CQI into a clean CQI or an unclean CQI based on a beam index used by the interfering device, and may report the dual CQI to the base station 105. In some cases, the classification may be achieved by tagging the CQI reported as clean or unclean. In some cases, the UE 115 may also tag a NACK as corresponding to an unclean CQI even if CQI reporting is not configured on a slot (e.g., a slot in which NACK is transmitted). The communications manager 102 may include a tagged CQI in the beam-specific measurement report.

Figure 2:
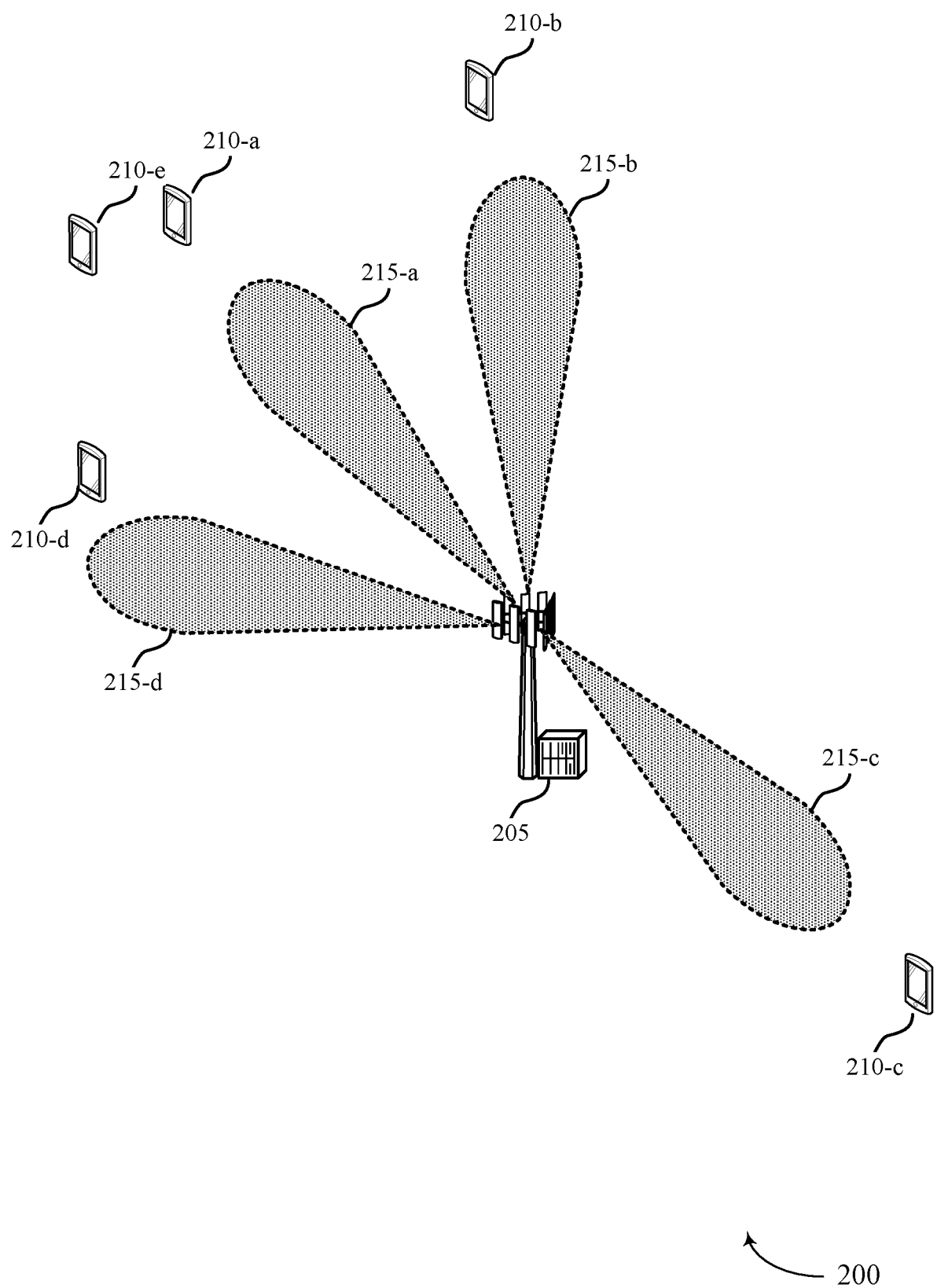
FIG. 2 illustrates an example of a wireless communications system that supports bursty interference mitigation techniques in accordance with aspects of the present disclosure.

FIG. 2 illustrates an example of a wireless communications system 200 that supports bursty interference mitigation techniques in accordance with various aspects of the present disclosure. In some examples, wireless communications system 200 may implement aspects of wireless communications system 100.

The wireless communications system 200 may include a base station 205, which may be an example of aspects of base station 105 as described with reference to FIG. 1. The wireless communications system 200 may also include a plurality of UEs 210, which may be examples of aspects of UEs 115 as described with reference to FIG. 1.

The base station 205 may include a plurality of antennas capable of being configured in a plurality of configurations. The base station 205 may use beamforming techniques to transmit in a directional manner. For example, the base station 205 may transmit to a first UE 210-a using a first beam 215-a (corresponding to a first antenna configuration), to a second UE 210-b using a second beam 215-b (corresponding to a second antenna configuration), to a third UE 210-c using a third beam 215-c (corresponding to a third antenna configuration), and to a fourth UE 210-d using a fourth beam 215-d (corresponding to a fourth antenna configuration).

Using beamforming techniques to transmit on a plurality of beams 215 may allow the base station 205 to improve signal quality by avoiding or minimizing interference from transmissions originating from directions other than the direction in which the wireless device is oriented. However, the use of beamforming techniques may also cause highly bursty interference, that is, interference that is transitional in nature. For example, consider the interference at a fifth UE 210-e located near the first UE 210-a. The fifth UE 210-e may be served by a second base station (not shown), but may experience interference from the first base station. When the base station 205 is transmitting using the first beam 215-a, the fifth UE 210-e may experience strong interference. When the base station 205 is transmitting using the second beam 215-b or the fourth beam 215-d, the fifth UE 210-e may experience moderate interference. When the base station 205 is transmitting using the third beam 215-c, the fifth UE 210-e may experience low interference.

The transitional nature of the interference (which can vary from high to low when the base station 205 is transmitting) may impact the operation of the fifth UE 210-e. For example, a channel state information-reference signal (CSI-RS) may be sent prior to the transmission of data. The modulation and coding scheme (MCS) applied to the data may be determined based on the CSI-RS. The CSI-RS may be observed in low interference conditions (e.g., when the base station 205 is transmitting using the third beam 215-c), but the data may be sent in high interference conditions (e.g., when the base station 205 is transmitting using the first beam 215-a). In such a case, the MCS may be overestimated, because a lower MCS should have been used. If, on the other hand, the CSI-RS is observed in high interference conditions, but the data is sent in low interference conditions, the MCS may be underestimated, because a higher MCS should have been used. In addition, when a mismatch occurs, the outer loop link adaptation procedures at the base station 205 may get de-stabilized, which may drive down performance even further.

The base station 205 may implement one or more techniques to mitigate the effects of bursty interference. The one or more techniques may include broadcast signaling of a transmission beam sequence, implementing a minimum dwell time, implementing a minimum revisit time, or a combination thereof.

In some examples, the base station 205 may select a transmission beam sequence for a wireless channel during a plurality of transmission slots. In some examples, the wireless channel may be a wireless channel of a licensed spectrum. In some other examples, the wireless channel may be a wireless channel of an unlicensed spectrum.

The transmission beam sequence may indicate which beam the base station 205 intends to use for transmissions during a corresponding transmission slot. In some examples, the transmission beam sequence may include a beam index for the beam to be used in each of the plurality of transmission slots. In some other examples, the transmission beam sequence may include a closest synchronization signal block (SSB) index for the beam to be used in each of the plurality of transmission slots. The transmission beam sequence may indicate a beam index for a number N of past transmission slots and a number M of future transmission slots, such that it may include beam indices for N+M transmission slots, where N and M are integers.

The base station 205 may transmit a broadcast control signal including an indication of the transmission beam sequence for the wireless channel. In some examples, the broadcast control signal may be transmitted on a group common physical downlink control channel (GC PDCCH).

The base station 205 may perform wireless transmissions over the plurality of transmission slots according to the transmission beam sequence. In each transmission slot, the base station 205 may transmit data over a corresponding beam identified in the transmission beam sequence.

In some examples, the base station 205 may transmit a reference signal in one or more of the transmission slots. The reference signal may be, for example, a CSI-RS. A UE 210 (such as the fifth UE 210-*e*) may receive the reference signal and prepare a beam-specific measurement report. The UE 210 may determine the beam on which the reference signal was transmitted based at least in part on the transmission beam sequence.

The beam-specific measurement report may include a reporting channel quality indicator (CQI). In some examples, the UE 210 may calculate a current CQI based on the reference signal and use the current CQI as the reporting CQI. In some other examples, the UE 210 may also determine one or more previous CQIs for the same transmission beam. The UE 210 may calculate an average CQI based at least in part on the current CQI and the one or more previous CQIs. The UE 210 may use the average CQI as the reporting CQI. In some cases, the UE 210 may average CQI over only the same beam index from an interfering device. For example, in mmW where there are few dominant jammers (e.g., one), a decision to average CQI may be made based on the dominant jammer only, even if there may be other varying interfering devices.

In some examples, interference from the base station 205 may be either very strong (e.g., when the base station 205 is using the first beam 215-*a*) or very weak (e.g., when the base station 205 is using any other beam). In such examples, the CQI may be either very bad or very good. In some examples, the UE 210 may classify the measured CQI and/or reporting CQI as clean (good) or unclean (bad). The classification may be reported to the base station 205, e.g., by tagging the reported CQI as clear or unclean. In some examples, the UE 210 may also tag a negative acknowledgement as corresponding to an unclean CQI, even if CQI reporting is not configured for that slot.

The base station 205 may receive the beam-specific measurement report, which may include a tagged CQI. The base station 205 may use the CQI tag for scheduling. For example, the base station 205 may schedule using beams corresponding to clean CQI tags, and fall back to beams corresponding to unclean CQI tags if the transmission on the beams corresponding to the clean CQI tags fail.

In some examples, an outer loop link adaptation procedure of the base station 205 may have more than one convergence level based at least in part on the CQI tags. For example, the base station 205 may perform dual outer loop link adaptation procedures, with a first outer loop link adaptation procedure corresponding to clean CQI and a second outer loop link adaptation procedure corresponding to unclean CQI. In some other examples, the base station 205 may freeze an outer loop link adaptation procedure (e.g. a rank adaptation procedure) upon receiving a NACK with an unclean CQI tag. In some examples, the outer loop link adaptation procedure may be a rank adaptation procedure.

The base station 205 may select a transmission beam sequence based at least in part on a minimum dwell time. The base station 205 may select a first transmission beam for a first transmission slot. For example, the base station 205 may select a second beam 215-*b*. The base station 205 may then stay on that beam for at least a threshold number of consecutive transmission slots (the minimum dwell time). For example, the base station 205 may stay on the first transmission beam (e.g., second beam 215-*b*) for at least K slots. After the K slots, the base station 205 may select a second transmission beam (e.g., third beam 215-*c*) for the (K+1)th transmission slot. The base station 205 may then stay on the second transmission beam (e.g., third beam 215-*c*) for at least the threshold number of consecutive transmission slots, e.g., until the 2Kth slot. The base station 205 may stay on a selected transmission beam for at least K slots every time a new transmission beam is selected (i.e., every time the base station 205 switches beams). In shared spectrum operation, a notion of transmission opportunity already exists and, in some cases, a transmission opportunity in shared spectrum operation may specify a maximum duration that may be occupied by a node (e.g., UE 115 or 210) once the node acquires a medium. The minimum dwell time, however, may refer to a minimum time that the node is expected to occupy on one beam direction (either with or without transmission) before switching to another beam direction. In some cases, the node may not have traffic to occupy the medium for the minimum dwell time (e.g., K slots), but "no transmission" during the minimum dwell time may be beneficial to an interfered UE in terms of constancy of interference.

In some examples, the base station 205 may refrain from transmitting on any transmission beam during one or more of the K slots. However, the base station 205 may not transmit on any other transmission beam during the K slots.

In some examples, the minimum dwell time may apply to a first set of channels, but may not apply to a second set of channels. For example, the minimum dwell time may apply only to a physical downlink shared channels (PDSCH), or may apply to PDSCH, physical uplink shared channels (PUSCH), and CSI-RS channels. The base station 205 may determine whether a selected channel is a minimum dwell channel. When the selected channel is a minimum dwell channel (e.g., PDSCH), the base station 205 may apply the minimum dwell time. When the selected channel is not a minimum dwell channel, the base station 205 may not apply the minimum dwell time. In some examples, a UE 210 may filter CSI over multiple slots when the minimum dwell time is applied. Additionally or alternatively, the base station 205 may use the filtered CSI in MCS selection as well as outer loop optimization. In some examples, the filtering of the CSI over multiple slots or the MCS selection and outer loop optimization may not be possible without ensuring constancy of interference.

Use of a minimum dwell time may improve the constancy of the interference. The minimum dwell time may decrease the likelihood that the CSI-RS and the data may be transmitted in different interference conditions, such that MCS selection is improved. The minimum dwell time may be applied independently, or may be applied in connection with the broadcast of the transmission beam sequence, such that the K consecutive slots may be indicated in the transmission beams sequence.

The base station 205 may select a transmission beam sequence based at least in part on a minimum beam revisit duration. The base station 205 may select a first transmission beam for a first transmission slot. For example, the base station 205 may select a second beam 215-*b*. The base station 205 may then stay off that beam for at least a threshold number of consecutive transmission slots (the minimum beam revisit duration). For example, the base station 205 may stay off the first transmission beam (e.g., second beam 215-*b*) for at least K slots (e.g., the second transmission slot through the (K+1)th transmission slot). After the K slots, the base station 205 may select the first transmission beam (e.g., second beam 215-*b*). In some examples, the minimum beam revisit duration may apply after a base station 205 leaves the first transmission beam. For example, the base station 205 may have scheduled transmissions on the first transmission beam for one or more slots prior to the first transmission slot. The base station 205 may stay off the first transmission beam for the threshold number of slots based at least in part on determining that a different transmission beam may be used for communications during the second transmission slot. In some examples utilizing a minimum dwell time, there may be a question as to how the base station 205 may occupy a medium for a long time (e.g., a minimum dwell time) if the base station 205 has no data to transmit. In the examples using the minimum beam revisit duration, however, the minimum beam revisit duration may allow short occupancies on a beam direction. In some examples, the minimum beam revisit duration may allow a rate control of an interfered link to recover by increasing an inter-burst duration on a given beam.

In some examples, the minimum beam revisit duration may apply to a first set of channels, but may not apply to a second set of channels. For example, the minimum beam revisit duration may apply only to a physical downlink shared channels (PDSCH), or may apply to PDSCH, physical uplink shared channels (PUSCH), and CSI-RS channels. The base station 205 may determine whether a selected channel is a minimum beam revisit channel. When the selected channel is a minimum beam revisit channel (e.g., PDSCH), the base station 205 may apply the minimum beam revisit duration. When the selected channel is not a minimum beam revisit channel, the base station 205 may not apply the minimum beam revisit duration.

Use of a minimum beam revisit duration may ensure that a strong interferer is a short-lived outlier rather than fluctuating back and forth. The minimum beam revisit duration may be applied independently, or may be applied in connection with the broadcast of the transmission beam sequence.

Figure 3:
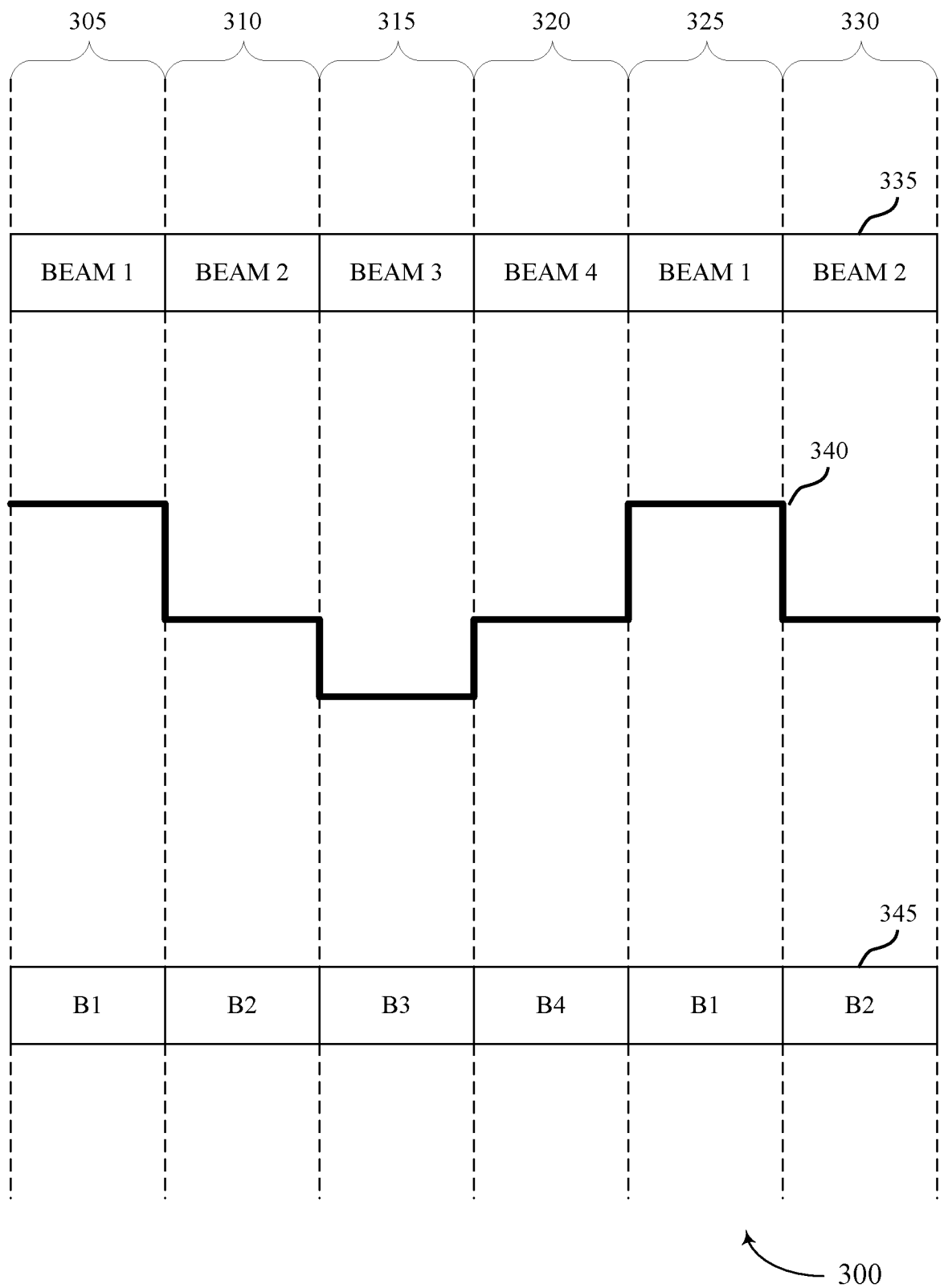
FIG. 3 illustrates an example of a wireless device transmission schedule in a wireless communications system that supports bursty interference mitigation techniques in accordance with aspects of the present disclosure.

FIG. 3 illustrates an example of a transmission beam sequence 300 for a wireless device in a wireless communications system that supports bursty interference mitigation techniques in accordance with various aspects of the present disclosure. In some examples, wireless communications system may implement aspects of wireless communications system 100.

The transmission beam sequence 300 shows scheduled transmission beams in a plurality of transmission slots including a first slot 305, a second slot 310, a third slot 315, a fourth slot 320, a fifth slot 325, and a sixth slot 330. The transmission beam sequence 300 may show scheduled transmission beams for a base station, which may be an example of aspects of base station 205 described with reference to FIG. 2.

The transmission beam sequence 300 includes a transmission beam sequence 335. The transmission beam sequence 335 indicates that the base station 205 will transmit using a first beam (BEAM 1) during a first slot 305 and a fifth slot 325, using a second beam (BEAM 2) during a second slot 310 and a sixth slot 330, using a third beam (BEAM 3) during a third slot 315, and using a fourth beam (BEAM 4) during a fourth slot 320. In some examples, the base station may select the transmission beams of the transmission beam sequence 335 at different times. For example, the base station 205 may select the transmission beams for the first three slots (the first slot 305, the second slot 310, and the third slot 315) prior to the first slot 305, and may determine the transmission beams for the second three slots (the fourth slot 320, the fifth slot 325, and the sixth slot 330) prior to the fourth slot 320. Accordingly, in some examples, the transmission beam sequence 335 may indicate transmission beams used during a number N of previous slots and transmission beams to be used during a number M of future slots, where N and M are integers.

The scheduled transmission beams may provide varying interference conditions for a UE, which may be an example of aspects of UE 210-e as described with reference to FIG. 2. The varying conditions may be shown in an interference indicator 340. The interference indicator 340 indicates that the first beam may provide high interference conditions, the second and fourth beam may provide moderate interference conditions, and the third beam may provide low interference conditions. The interference variation could be, for example, 20 to 30 dB between the high interference conditions and the low interference conditions. In some examples, such varying interference conditions may cause overestimation or underestimation of MCS for data transmission.

In order to mitigate the effects of bursty interference, the base station 205 may transmit a broadcast signal, which may be broadcast on a GC PDCCH. The broadcast signal may include an indication of beam indices 345. The indication of beam indices 345 may include a beam index corresponding to the beam to be used in each of the transmission slots. For example, the indication of beam indices 345 may include a beam index B1 (corresponding to the first beam) for the first slot 305, and a beam index B2 (corresponding to the second beam) for the second slot 310. In some examples, a closest SSB index may be used rather than the beam index, which may use a smaller number of bits and may decrease overhead. In some cases, a receiving device (e.g., a UE 115 or 210 described herein with reference to FIGS. 1 and 2, respectively) may reconstruct beam patterns based at least in part on a signaling enhancement by the broadcast signal including the indication of beam indices used. For example, all UEs that may receive the broadcast signal may be able to associate their CQI with a beam index from an interfering device. For UEs that do not receive the broadcast signal, it can be assumed that the interfering device is not strong enough to cause substantial interference when scheduling on that beam direction.

In some examples, the indication of beam indices 345 may be transmitted during the plurality of transmission slots, e.g., at the start of the fourth slot 320. In such an example, the broadcast may indicate a first set of beam indices for previous slots and a second set of beam indices for future slots.

Figure 4:
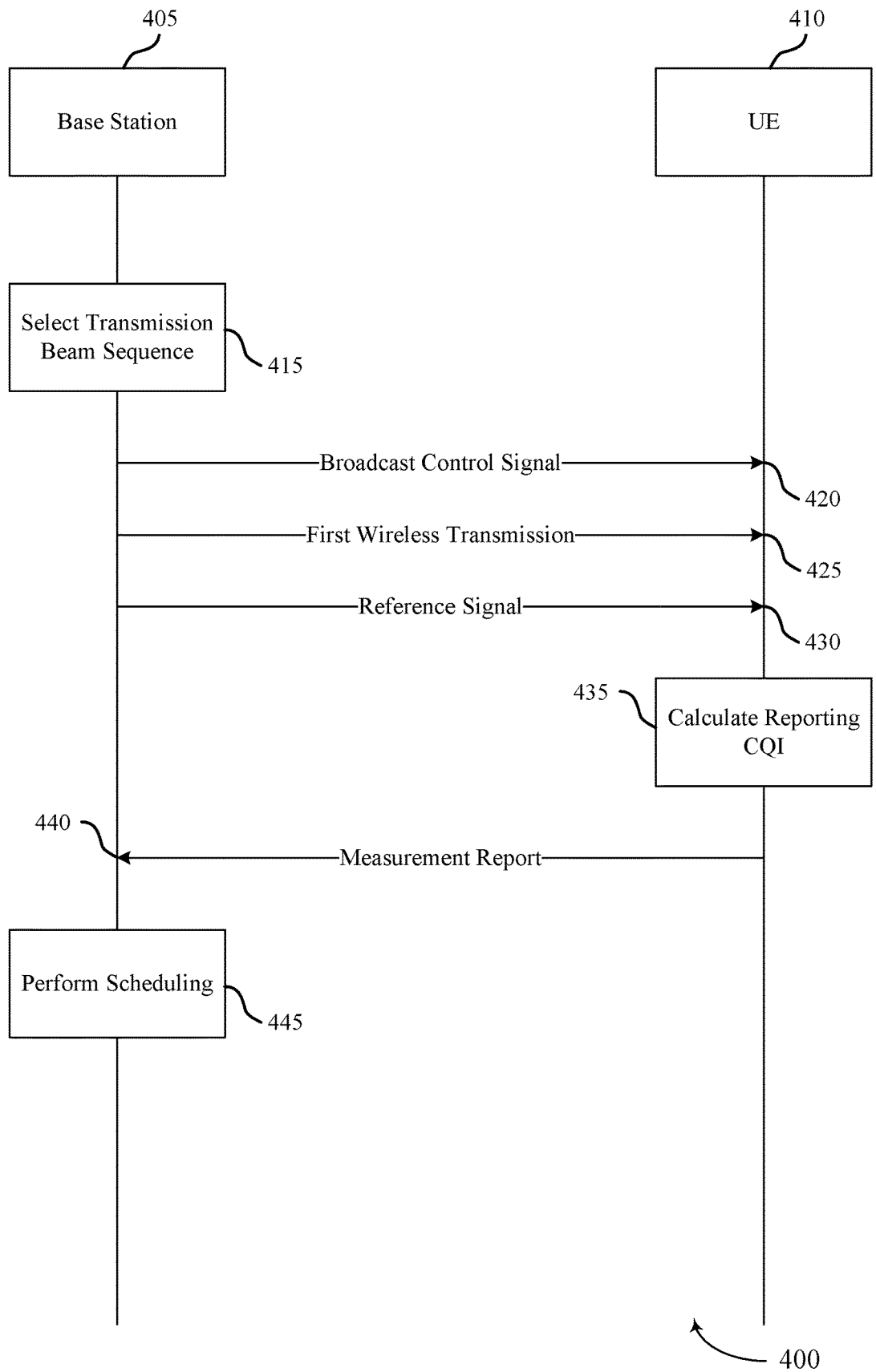
FIG. 4 illustrates an example of a communication flow in a wireless communications system that supports bursty interference mitigation techniques in accordance with aspects of the present disclosure.

FIG. 4 illustrates an example of a communication flow 400 in a wireless communications system that supports bursty interference mitigation techniques in accordance with various aspects of the present disclosure. In some examples, the wireless communications system may implement aspects of wireless communications system 100.

The communication flow 400 may show communications between a base station 405 and a UE 410. The base station 405 may be an example of aspects of base station 105 as described with reference to FIG. 1. The UE 410 may be an example of aspects of UE 115 described with reference to FIG. 1 or one of the UEs 210 described with reference to FIG. 2.

The base station 405 may select a transmission beam sequence at 415. In some examples, the base station 405 may select a transmission beam from all available transmission beams to be used during each of a plurality of slots in the transmission beam sequence. In some other examples, the base station 405 may select a transmission beam to be used in each of the plurality of slots based on certain constraints, e.g., a minimum dwell time and/or a minimum beam revisit duration.

The base station 405 may transmit a broadcast control signal 420. The broadcast control signal 420 may include an indication of the transmission beam sequence for the wireless channel. The indication of the transmission beam sequence may be an example of aspects of the indication of the transmission beam sequence 300 as described with reference to FIG. 3.

The base station 405 may transmit a first wireless transmission 425 in accordance with the transmission beam sequence. The first wireless transmission 425 may be transmitted during a first transmission slot. The transmission beam sequence may indicate that a first transmission beam is to be used for transmissions during the first transmission slot. Accordingly, the base station 405 may transmit the first wireless transmission 425 using the first transmission beam.

The base station 405 may transmit a reference signal 430 in accordance with the transmission beam sequence. The reference signal 430 may be, for example, a CSI-RS. The reference signal 430 may be transmitted during a second transmission slot. The transmission beam sequence may indicate that a second transmission beam is to be used for transmissions during the second transmission slot. Accordingly, the base station 405 may transmit the reference signal 430 using the second transmission beam.

The UE 410 may receive the reference signal 430 and calculate a reporting CQI at 435. In some examples, the UE 410 may calculate a current CQI based at least in part on the reference signal 430, and use the current CQI as the reporting CQI. In some other examples, the UE 410 may determine one or more previous CQIs corresponding to the transmission beam used to transmit the reference signal 430. The UE 410 may determine the transmission beam used to transmit the reference signal 430 based at least in part on the indication of the transmission beam sequence in the broadcast control signal 420. The UE 410 may determine an average CQI based at least in part on the current CQI and the one or more previous CQIs. The UE 410 may use the average CQI as the reporting CQI.

In some examples, interference may be bimodal in nature. For example, interference may either be very strong or very weak. The measured CQI and/or the reporting CQI may accordingly be either very bad or very good. Very good CQI conditions may be classified as clean, while very bad CQI conditions may be classified as unclean.

The UE 410 may transmit a beam-specific measurement report 440. The beam-specific measurement report 440 may include the reporting CQI. The reporting CQI may be tagged as either clean or unclean. In some examples, a negative acknowledgement tagged as unclean may be transmitted instead of the beam-specific measurement report.

The base station 405 may perform scheduling at 445. The scheduling may be performed based at least in part on the beam-specific measurement report. For example, the base station 405 may select transmission beams for use during a second plurality of transmission slots. The base station 405 may select beams tagged as clean. The base station may fall back to beams tagged as unclean when transmissions with clean beams fail. As such, the base station 405 may not run a single outer loop on both types of CQI (e.g., clean and unclean CQIs). In some cases, an outer loop may try to converge to a stable CQI value by applying corrections to CQI, whereas in a mmW scenario there may be more than one convergence level (e.g., bimodal CQI).

In some examples, the base station 405 may perform two outer loop link adaptation procedures. A first outer loop link adaptation procedure may correspond to beams tagged as clean. A second outer loop link adaptation procedure may correspond to beams tagged as unclean. In some examples, the base station 405 may freeze an outer loop link adaptation procedure when a NACK tagged as unclean is received. In some examples, the outer loop link adaptation procedure may be a rank adaptation procedure.

Figure 5:
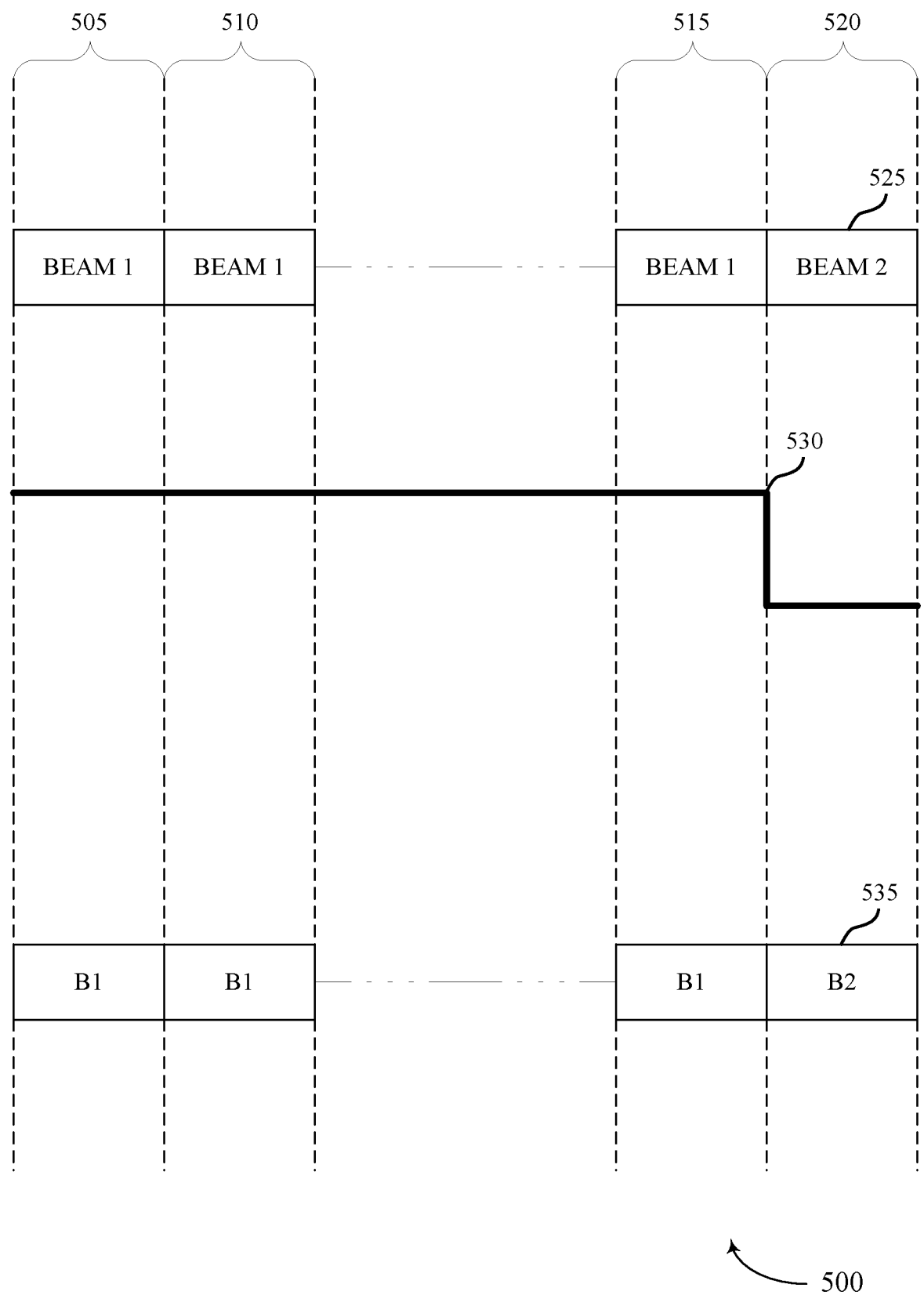
FIG. 5 illustrates an example of a wireless device transmission schedule in a wireless communications system that supports bursty interference mitigation techniques in accordance with aspects of the present disclosure.

FIG. 5 illustrates an example of a wireless device transmission schedule 500 in a wireless communications system that supports bursty interference mitigation techniques in accordance with various aspects of the present disclosure. In some examples, the wireless communications system may implement aspects of wireless communications system 100.

The wireless device transmission schedule 500 shows scheduled transmission beams in a plurality of transmission slots including a first slot 505, a second slot 510, a Kth slot 515, and a (K+1)th slot 520. The wireless device transmission schedule 500 may show scheduled transmission beams for a base station, which may be an example of aspects of base station 205 described with reference to FIG. 2.

The wireless device transmission schedule 500 may show scheduled transmission beams selected in accordance with a minimum dwell time, which may be K slots. The wireless device transmission schedule 500 includes a transmission beam sequence 525. The base station 205 may select a first beam (BEAM 1) for the first slot 505. The base station 205 may then stay on the first beam for the minimum dwell time of K slots, including the second slot 510 and the Kth slot 515. In some examples, the base station 205 may refrain from transmitting in one or more of the first slot 505 through Kth slot 515. However, the base station 205 may not transmit using any transmission beam other than the first transmission beam during the first K slots.

By staying on the first beam for K slots, an interfered UE (e.g., UE 210-*e* described with reference to FIG. 2) may experience constant interference over a period of time corresponding to the minimum dwell time, which may allow the interfered UE to adjust, and may minimize the likelihood that a CSI-RS and the corresponding data will experience different interference conditions.

After the minimum dwell time of K slots, the base station 205 may select a second beam (BEAM 2). The base station 205 may then stay on the second beam from the (K+1)th slot until the 2Kth slot.

In some examples, the selection of transmission beams using a minimum dwell time may be used to determine a transmission beam sequence to be broadcast. For example, the beam selection procedure described with reference to FIG. 5 may be used as part of the transmission beam selection procedure at 415 in FIG. 4. In some examples, the broadcast control signal 420 may include an indication of beam indices 535 which have been selected based on the minimum dwell time. In some examples, each beam index may be closest SSB index to the transmission beam. For example, the beam indices corresponding to slots 1 through K may be a closest SSB index to beam 1. The use of a closest SSB index rather than the beam index may use fewer bits and reduce overhead.

Figure 6:
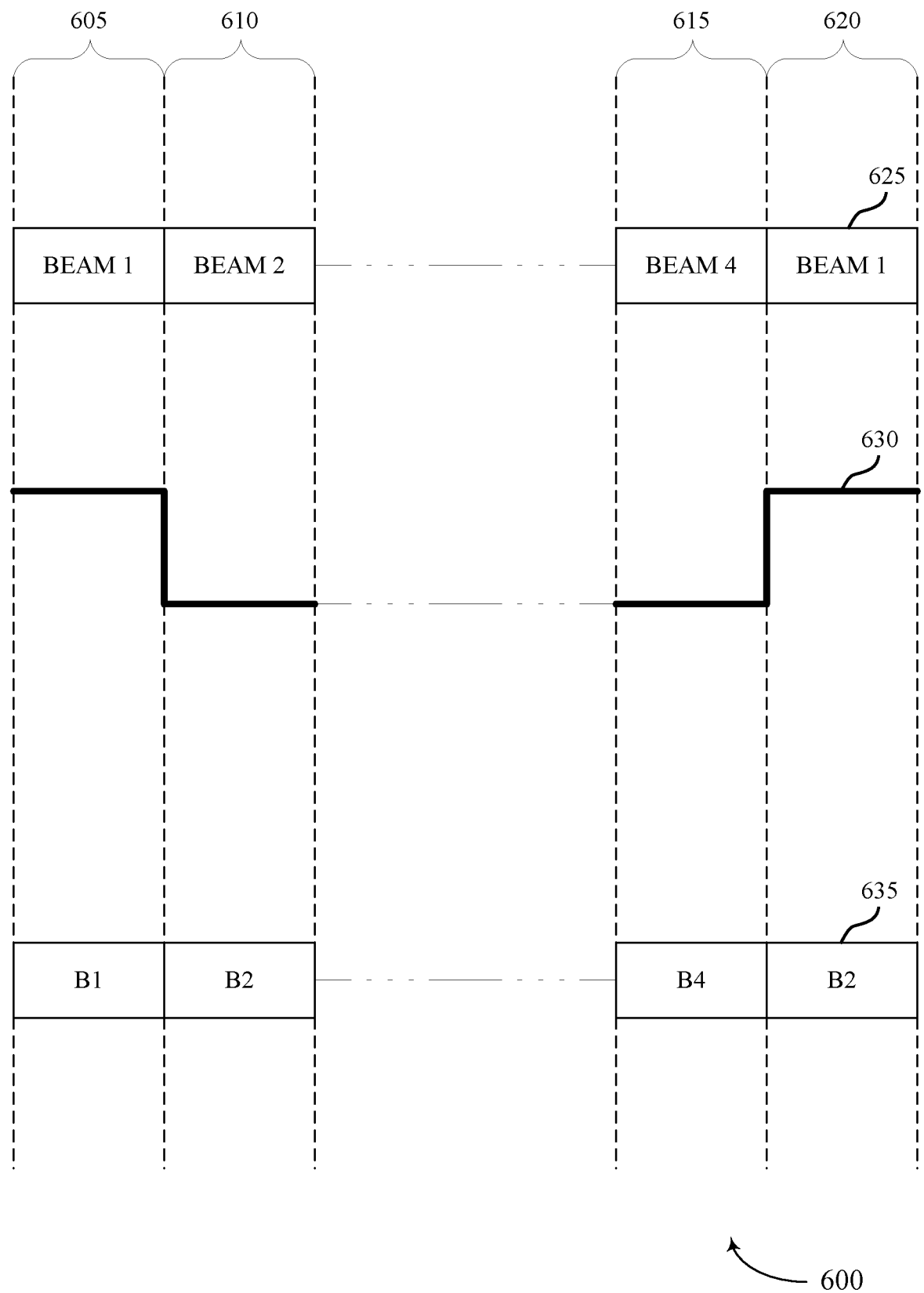
FIG. 6 illustrates an example of a wireless device transmission schedule in a wireless communications system that supports bursty interference mitigation techniques in accordance with aspects of the present disclosure.

FIG. 6 illustrates an example of a wireless device transmission schedule 600 in a wireless communications system that supports bursty interference mitigation techniques in accordance with various aspects of the present disclosure. In some examples, the wireless communications system may implement aspects of wireless communications system 100.

The wireless device transmission schedule 600 shows scheduled transmission beams in a plurality of transmission slots including a first slot 605, a second slot 610, a (K+1)th slot 615, and a (K+2)th slot 620. The wireless device transmission schedule 600 may show scheduled transmission beams for a base station, which may be an example of aspects of base station 205 described with reference to FIG. 2.

The wireless device transmission schedule 600 may show scheduled transmission beams selected in accordance with a minimum beam revisit duration, which may be K slots. The wireless device transmission schedule 600 includes a transmission beam sequence 625. The base station 205 may select a first beam (BEAM 1) for the first slot 605. The base station 205 may then stay off the first beam for the minimum beam revisit duration of K slots, including the second slot 610 and the (K+1)th slot 615.

In some examples, the first beam may be a dominant interferer, such that interference from other beams may have significantly less effect on the interfered UE (e.g., UE 210-e described with reference to FIG. 2). By staying off the first beam for K slots, an interfered UE may experience the dominant interferer as a short-lived outlier.

After the minimum beam revisit duration of K slots, the base station may select the first beam again. The base station 205 may then stay off the first beam for another K slots.

In some examples, the minimum revisit duration may apply when a base station leaves a transmission beam. For example, the base station 205 may have selected the first beam for one or more transmission slots immediately before the first slot 605. The base station 205 may select the second beam for the second slot 610, and may apply the minimum beam revisit duration for the first beam based at least in part on determining that the base station has left the first beam.

In some examples, the selection of transmission beams using a minimum beam revisit duration may be used to determine a transmission beam sequence to be broadcast. For example, the beam selection procedure described with reference to FIG. 6 may be used as part of the transmission beam selection procedure at 415 in FIG. 4. In some examples, the broadcast control signal 420 may include an indication of beam indices 635 which have been selected based on the minimum dwell time. In some examples, each beam index may be closest SSB index to the transmission beam. For example, the beam indices corresponding to slots 1 and K+2 may be a closest SSB index to beam 1. The use of a closest SSB index rather than the beam index may use fewer bits and reduce overhead.

Figure 7:
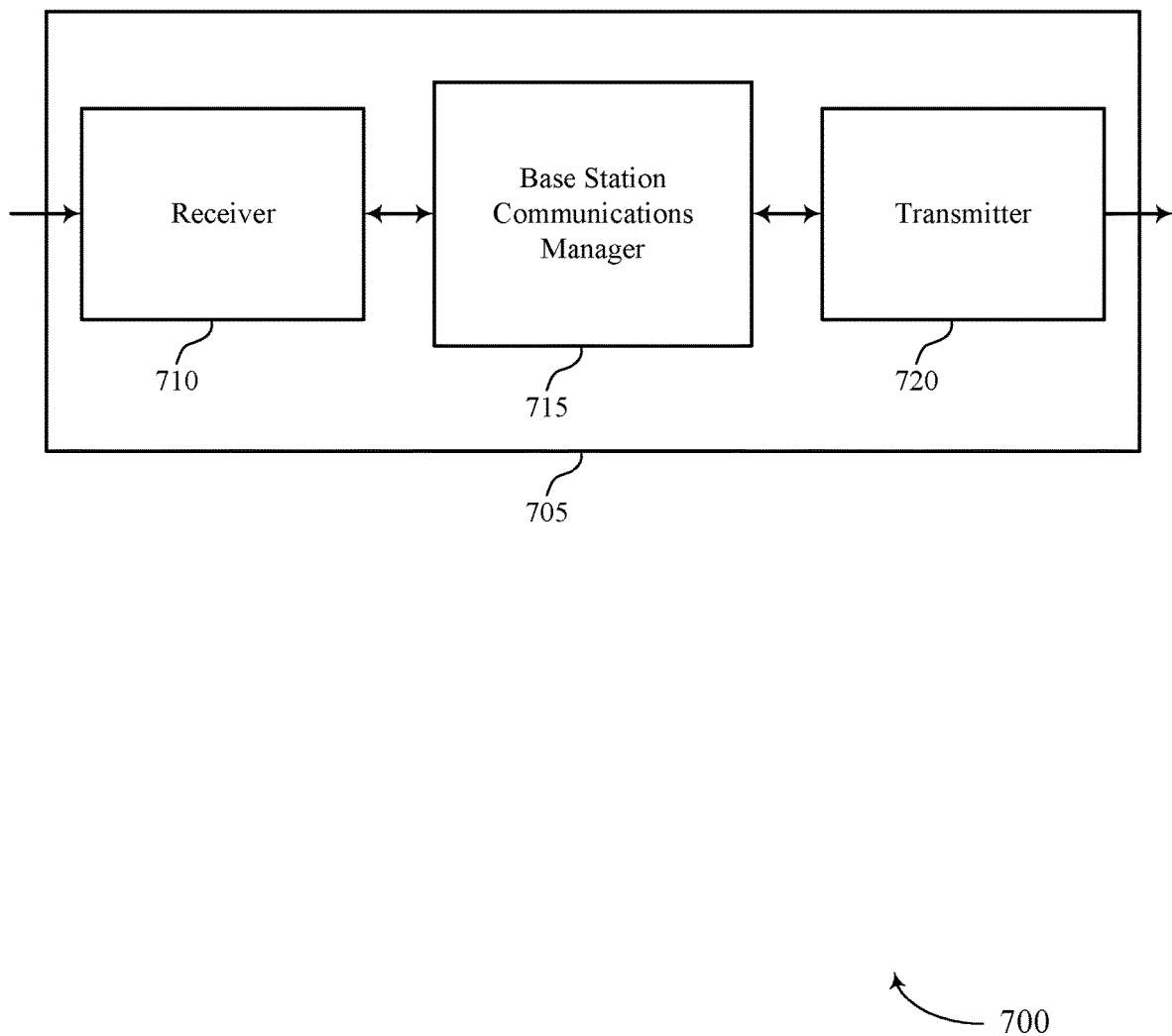
FIGS. 7 through 9 show block diagrams of a device that supports bursty interference mitigation techniques in accordance with aspects of the present disclosure.

FIG. 7 shows a block diagram 700 of a wireless device 705 that supports bursty interference mitigation techniques in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to bursty interference mitigation techniques, etc.). Information may be passed on to other components of the device 705. The receiver 710 may be an example of aspects of the transceiver 1035 described with reference to FIG. 10. The receiver 710 may utilize a single antenna or a set of antennas.

Base station communications manager 715 may be an example of aspects of the base station communications manager 1015 described with reference to FIG. 10.

Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may select a transmission beam sequence for a wireless channel during a plurality of transmission slots, transmit a broadcast control signal including an indication of the transmission beam sequence for the wireless channel, and perform wireless transmissions over the plurality of transmission slots according to the transmission beam sequence.

Transmitter 720 may transmit signals generated by other components of the device 705. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
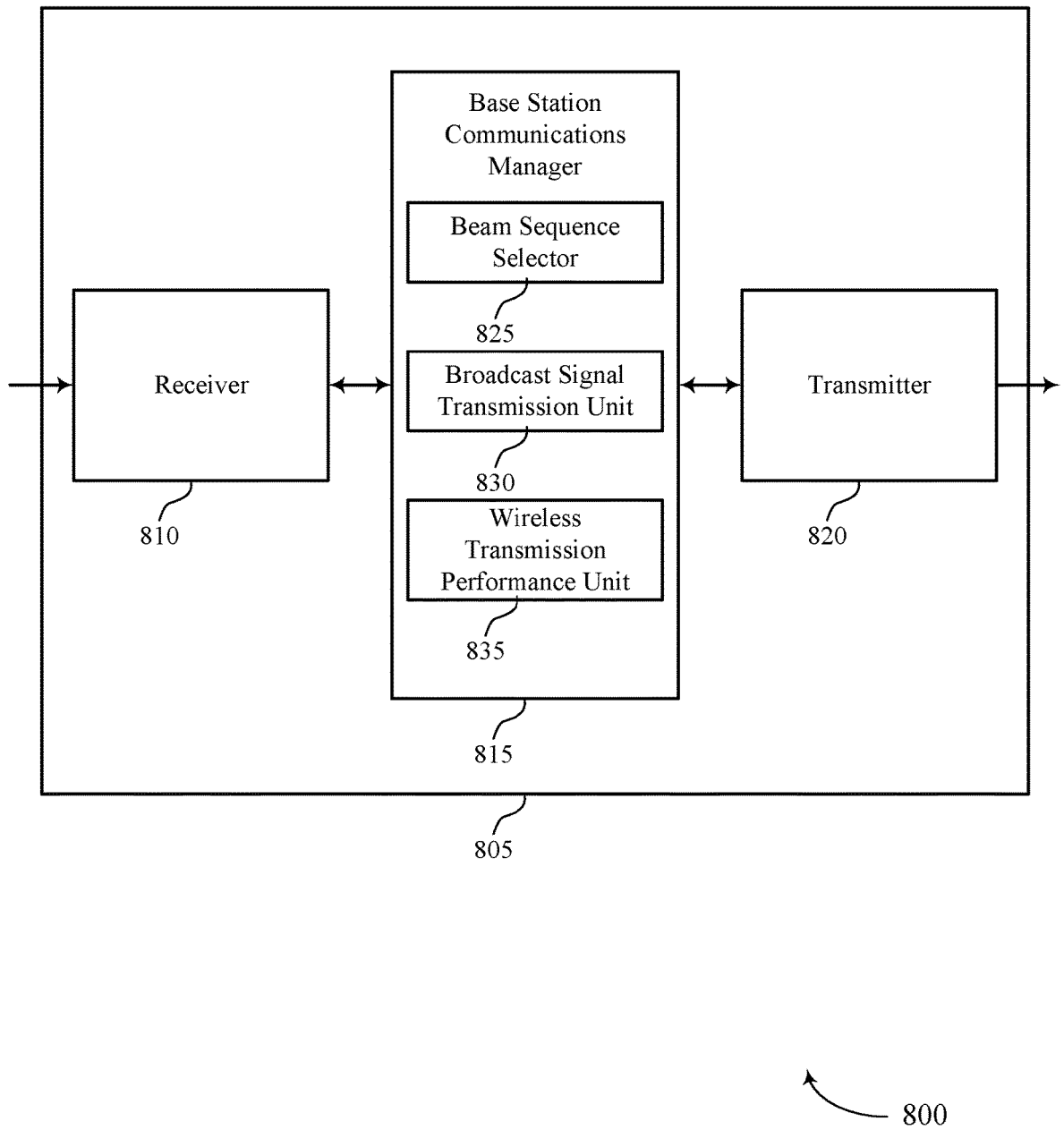

FIG. 8 shows a block diagram 800 of a wireless device 805 that supports bursty interference mitigation techniques in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to bursty interference mitigation techniques, etc.). Information may be passed on to other components of the device 805. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10.

Base station communications manager 815 may also include beam sequence selector 825, broadcast signal transmission unit 830, and wireless transmission performance unit 835.

Beam sequence selector 825 may select a transmission beam sequence for a wireless channel during a plurality of transmission slots and select a second beam sequence based on the indication of interference on the transmission beam. In some cases, the transmission beam sequence includes an indication of a transmission beam to be used in each of the plurality of transmission slots. In some cases, selecting the transmission beam sequence includes: selecting a first transmission beam. In some cases, selecting the transmission beam sequence includes: scheduling a first wireless transmission on a first transmission beam during a first transmission slot of the plurality of transmission slots.

Broadcast signal transmission unit 830 may transmit a broadcast control signal including an indication of the transmission beam sequence for the wireless channel. In some cases, the indication of the transmission beam includes a beam index for the transmission beam. In some cases, the indication of the transmission beam includes a closest synchronization signal block index to the transmission beam. In some cases, the broadcast control signal is transmitted after a first plurality of slots of the plurality of transmission slots and before a second plurality of slots of the plurality of transmission slots. In some cases, the broadcast control signal is transmitted on a group common physical downlink control channel (GC physical downlink control channel (PDCCH)).

Wireless transmission performance unit 835 may perform wireless transmissions over the plurality of transmission slots according to the transmission beam sequence.

Transmitter 820 may transmit signals generated by other components of the device 805. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
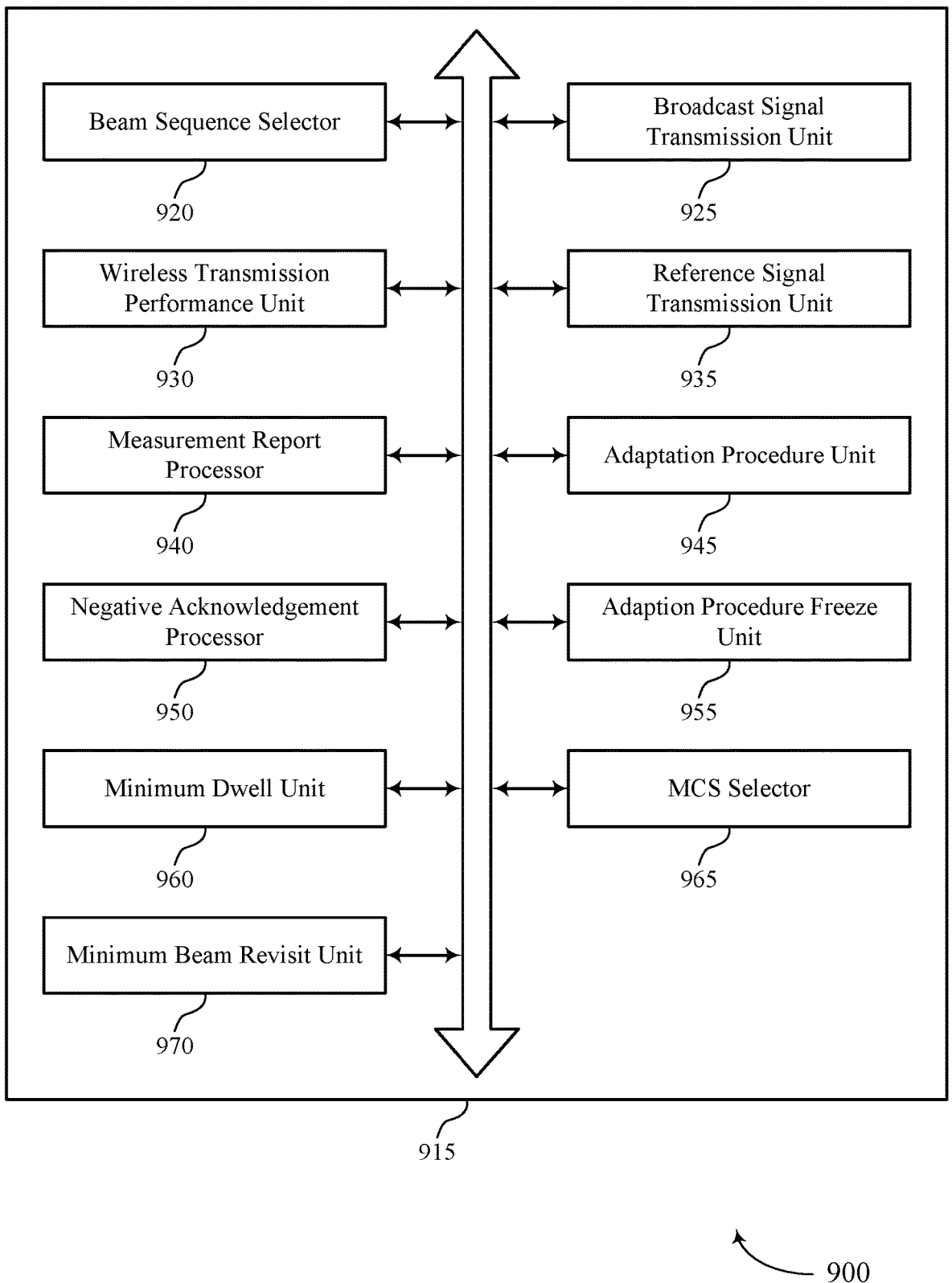

FIG. 9 shows a block diagram 900 of a base station communications manager 915 that supports bursty interference mitigation techniques in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include beam sequence selector 920, broadcast signal transmission unit 925, wireless transmission performance unit 930, reference signal transmission unit 935, measurement report processor 940, adaptation procedure unit 945, negative acknowledgement processor 950, adaption procedure freeze unit 955, minimum dwell unit 960, MCS selector 965, and minimum beam revisit unit 970. Each of these modules may communicate, directly or indirectly, with one another (e.g., via one or more buses).

Beam sequence selector 920 may select a transmission beam sequence for a wireless channel during a plurality of transmission slots and select a second beam sequence based on the indication of interference on the transmission beam. In some cases, the transmission beam sequence includes an indication of a transmission beam to be used in each of the plurality of transmission slots. In some cases, selecting the transmission beam sequence includes: selecting a first transmission beam. In some cases, selecting the transmission beam sequence includes: scheduling a first wireless transmission on a first transmission beam during a first transmission slot of the plurality of transmission slots.

Broadcast signal transmission unit 925 may transmit a broadcast control signal including an indication of the transmission beam sequence for the wireless channel. In some cases, the indication of the transmission beam includes a beam index for the transmission beam. In some cases, the indication of the transmission beam includes a closest synchronization signal block index to the transmission beam. In some cases, the broadcast control signal is transmitted after a first plurality of slots of the plurality of transmission slots and before a second plurality of slots of the plurality of transmission slots. In some cases, the broadcast control signal is transmitted on a group common physical downlink control channel (GC PDCCH).

Wireless transmission performance unit 930 may perform wireless transmissions over the plurality of transmission slots according to the transmission beam sequence.

Reference signal transmission unit 935 may transmit a reference signal over the wireless channel during one of the transmission slots based on the transmission beam sequence.

Measurement report processor 940 may receive a beam-specific measurement report for the wireless channel based on the reference signal and the transmission beam sequence. In some cases, the beam-specific measurement report includes an indication of interference on a first transmission beam. In some cases, the indication of interference on the transmission beam includes a clean tag.

Adaptation procedure unit 945 may perform a first outer loop link adaptation procedure corresponding to a first state of the indication and perform a second outer loop link adaptation procedure corresponding to a second state of the indication. In some cases, the first outer loop link adaptation procedure includes a first rank adaptation procedure. In some cases, the second outer loop link adaptation procedure includes a second rank adaptation procedure.

Negative acknowledgement processor 950 may receive a negative acknowledgement (NACK) corresponding to the reference signal.

Adaption procedure freeze unit 955 may freeze an outer loop link adaptation procedure based on receiving the negative acknowledgement (NACK).

Minimum dwell unit 960 may schedule transmissions on the first transmission beam for at least a threshold number of consecutive transmission slots of the plurality of transmission slots and determine that the wireless channel is a minimum dwell channel, where transmissions are scheduled on the first transmission beam for at least the threshold number of consecutive transmission slots of the plurality of transmission slots based on the determining. In some cases, scheduling transmissions on the first transmission beam for at least the threshold number of consecutive transmission slots includes: refraining from scheduling any transmissions on the wireless channel during one of the at least the threshold number of consecutive transmission slots.

MCS selector 965 may select a modulation and coding scheme (MCS) based on the scheduling transmissions on the first transmission beam for at least the threshold number of consecutive transmission slots.

Minimum beam revisit unit 970 may refrain from scheduling additional transmissions on the first transmission beam for at least a threshold number of slots after the first transmission slot and determine that the wireless channel is a minimum revisit channel, where the additional transmissions are refrained from being scheduled on the first transmission beam for at least the threshold number of slots after the first transmission slot based on the determining.

Figure 10:
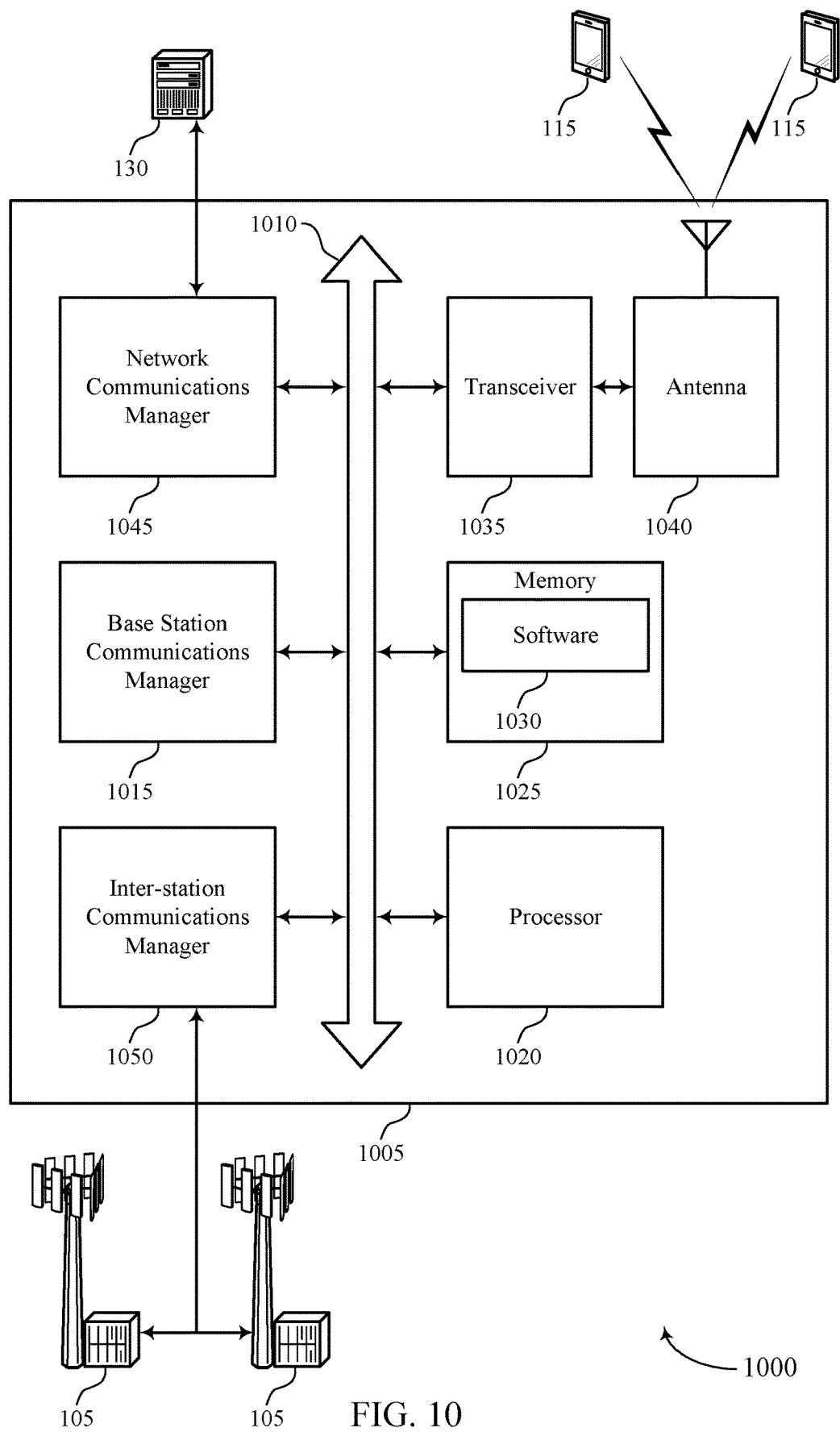
FIG. 10 illustrates a block diagram of a system including a base station that supports bursty interference mitigation techniques in accordance with aspects of the present disclosure.

FIG. 10 shows a diagram of a system 1000 including a device 1005 that supports bursty interference mitigation techniques in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more user equipment (UE)s 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting bursty interference mitigation techniques).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support bursty interference mitigation techniques. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device 1005 may include a single antenna 1040. However, in some cases the device 1005 may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an Long Term Evolution (LTE)/LTE-A wireless communication network technology to provide communication between base stations 105.

Figure 11:
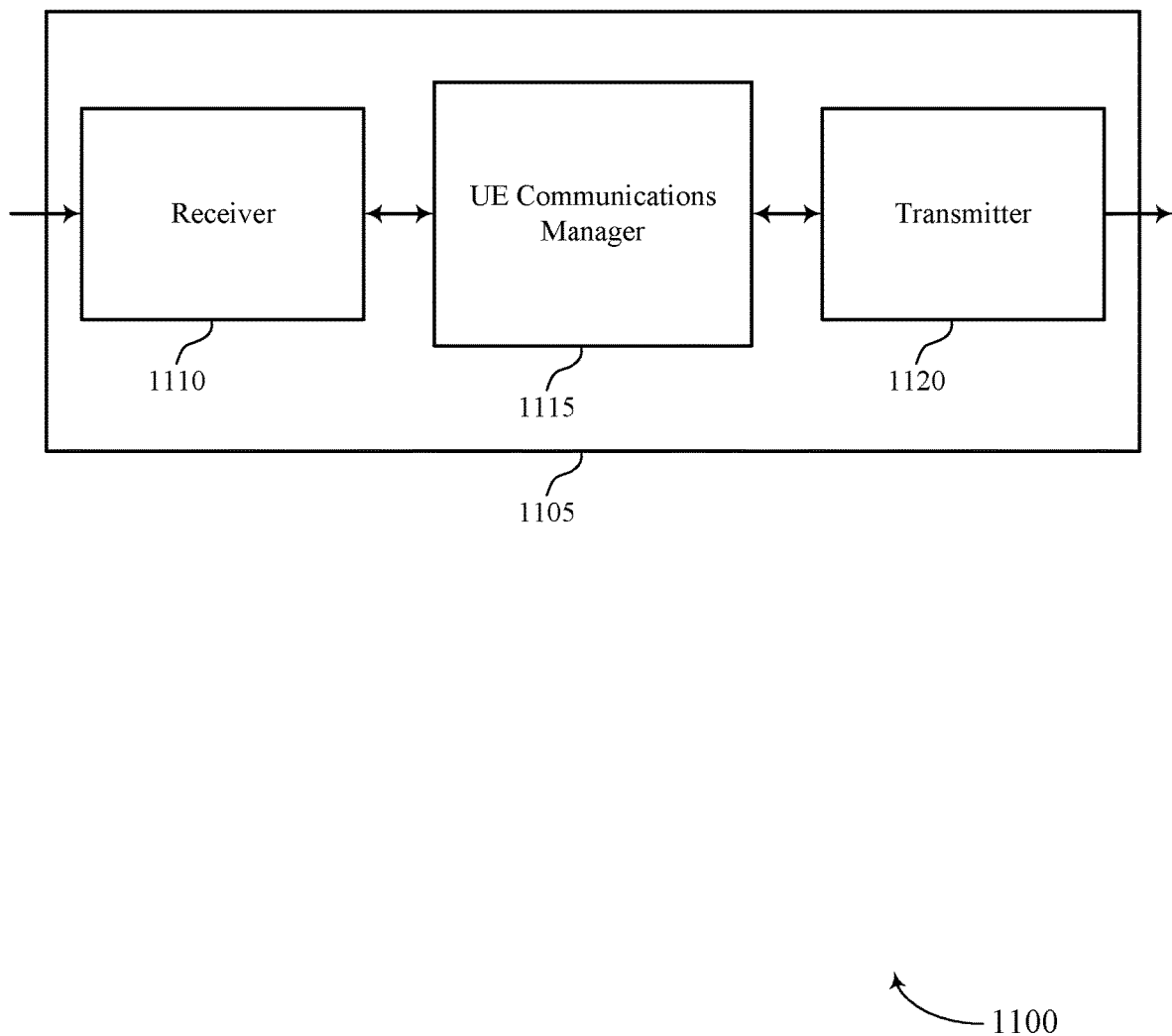
FIGS. 11 through 13 show block diagrams of a device that supports bursty interference mitigation techniques in accordance with aspects of the present disclosure.

FIG. 11 shows a block diagram 1100 of a wireless device 1105 that supports bursty interference mitigation techniques in accordance with aspects of the present disclosure. Wireless device 1105 may be an example of aspects of a UE 115 or a UE 210 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to bursty interference mitigation techniques, etc.). Information may be passed on to other components of the device 1105. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive over a wireless channel a broadcast control signal including an indication of a transmission beam sequence for the wireless channel during a plurality of transmission slots, receive a reference signal during one of the plurality of transmission slots, and transmit a beam-specific measurement report to a base station 105 based on the received reference signal and the transmission beam sequence.

Transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
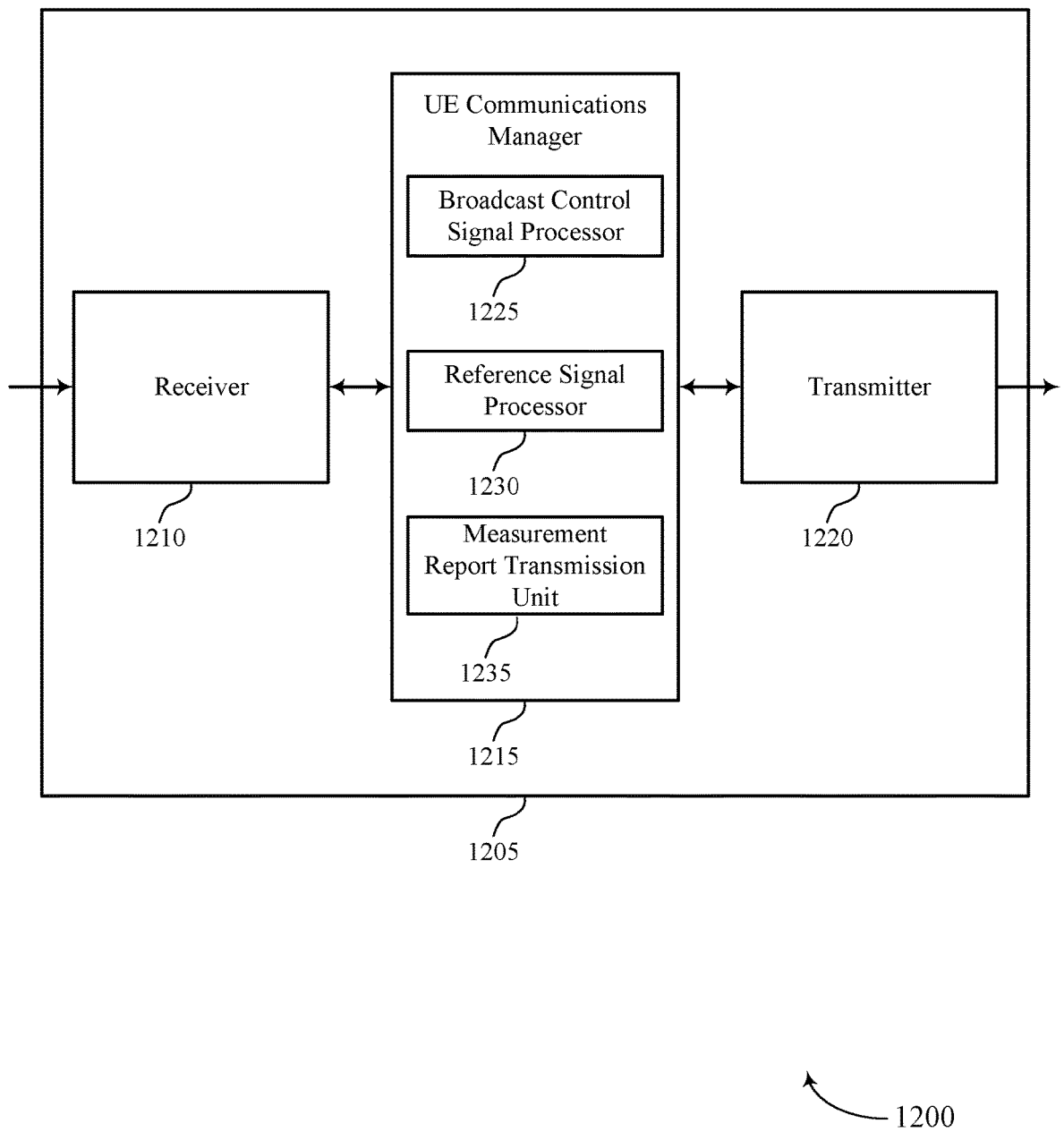

FIG. 12 shows a block diagram 1200 of a wireless device 1205 that supports bursty interference mitigation techniques in accordance with aspects of the present disclosure. Wireless device 1205 may be an example of aspects of a wireless device 1105 or a UE 115 or a UE 210 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to bursty interference mitigation techniques, etc.). Information may be passed on to other components of the device 1205. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include broadcast control signal processor 1225, reference signal processor 1230, and measurement report transmission unit 1235.

Broadcast control signal processor 1225 may receive over a wireless channel a broadcast control signal including an indication of a transmission beam sequence for the wireless channel during a plurality of transmission slots and determine, based on the indication of the transmission beam sequence, that wireless transmissions are scheduled on a first transmission beam for a number of consecutive transmission slots.

Reference signal processor 1230 may receive a reference signal during one of the plurality of transmission slots.

Measurement report transmission unit 1235 may transmit a beam-specific measurement report to a base station 105 based on the received reference signal and the transmission beam sequence. In some cases, the beam-specific measurement report includes a reported channel quality indicator (CQI) for a transmission beam corresponding to the reference signal.

Transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
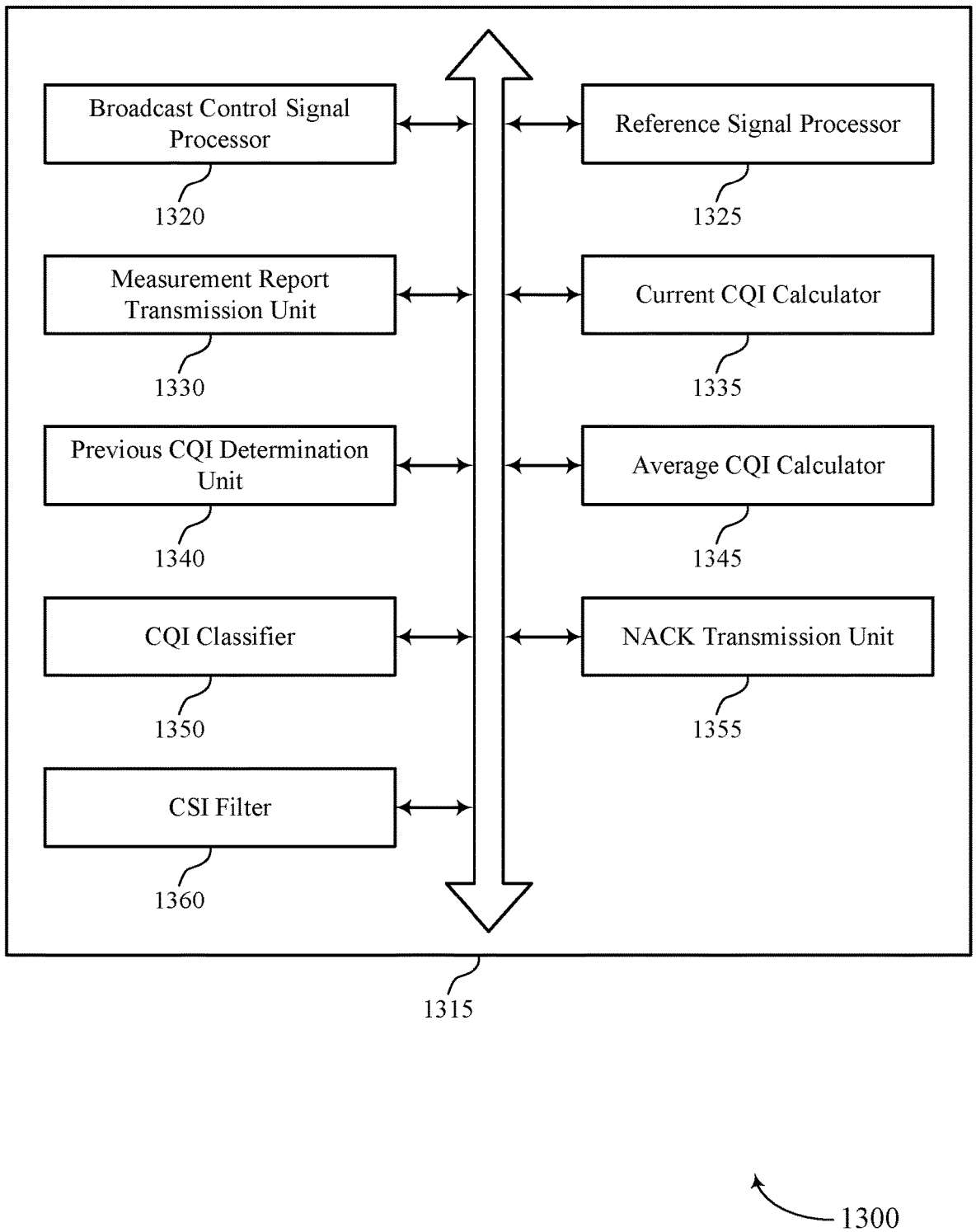

FIG. 13 shows a block diagram 1300 of a UE communications manager 1315 that supports bursty interference mitigation techniques in accordance with aspects of the present disclosure. The UE communications manager 1315 may be an example of aspects of a UE communications manager 1415 described with reference to FIGS. 11, 12, and 14. The UE communications manager 1315 may include broadcast control signal processor 1320, reference signal processor 1325, measurement report transmission unit 1330, current CQI calculator 1335, previous CQI determination unit 1340, average CQI calculator 1345, CQI classifier 1350, NACK transmission unit 1355, and channel state information (CSI) filter 1360. Each of these modules may communicate, directly or indirectly, with one another (e.g., via one or more buses).

Broadcast control signal processor 1320 may receive over a wireless channel a broadcast control signal including an indication of a transmission beam sequence for the wireless channel during a plurality of transmission slots and determine, based on the indication of the transmission beam sequence, that wireless transmissions are scheduled on a first transmission beam for a number of consecutive transmission slots.

Reference signal processor 1325 may receive a reference signal during one of the plurality of transmission slots.

Measurement report transmission unit 1330 may transmit a beam-specific measurement report to a base station 105 based on the received reference signal and the transmission beam sequence. In some cases, the beam-specific measurement report includes a reported channel quality indicator (CQI) for a transmission beam corresponding to the reference signal.

Current CQI calculator 1335 may determine a current CQI for the transmission beam.

Previous CQI determination unit 1340 may determine one or more previous CQIs for the transmission beam.

Average CQI calculator 1345 may calculate an average CQI for the transmission beam based on the current CQI and the one or more previous CQIs, where the average CQI is used as the reported CQI.

CQI classifier 1350 may determine a classification of an interference state of the reported CQI, where the beam-specific measurement report includes the classification of the interference state. In some cases, the classification is one of a clean CQI and an unclean CQI.

NACK transmission unit 1355 may transmit a NACK based on determining that the reference signal was not received, where the NACK includes the classification.

CSI filter 1360 may filter channel state information over the number of consecutive transmission slots.

Figure 14:
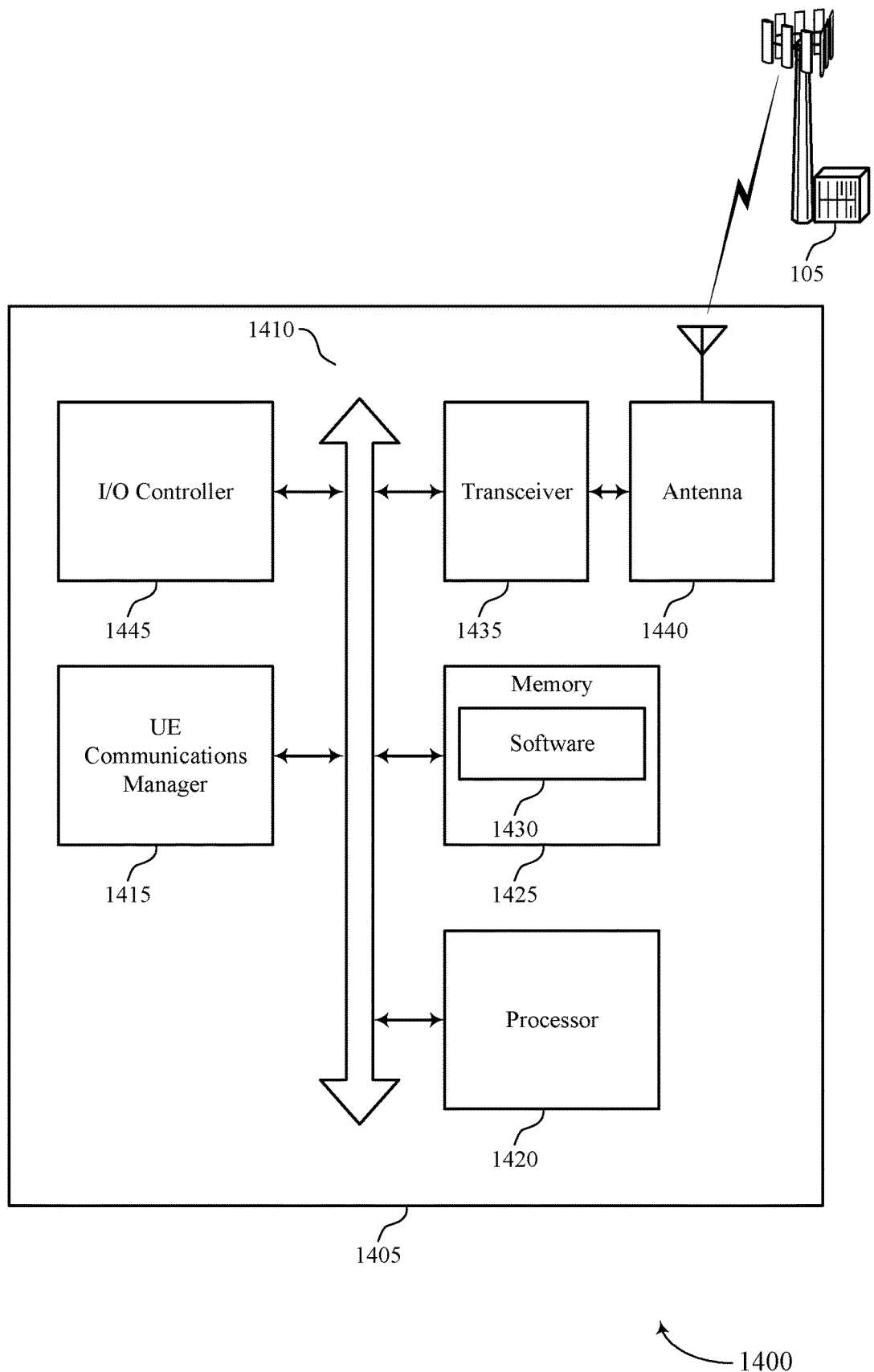
FIG. 14 illustrates a block diagram of a system including a UE that supports bursty interference mitigation techniques in accordance with aspects of the present disclosure.

FIG. 14 shows a diagram of a system 1400 including a device 1405 that supports bursty interference mitigation techniques in accordance with aspects of the present disclosure. Device 1405 may be an example of or include the components of UE 115 or UE 210 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting bursty interference mitigation techniques).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support bursty interference mitigation techniques. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device 1405 may include a single antenna 1440. However, in some cases the device 1405 may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
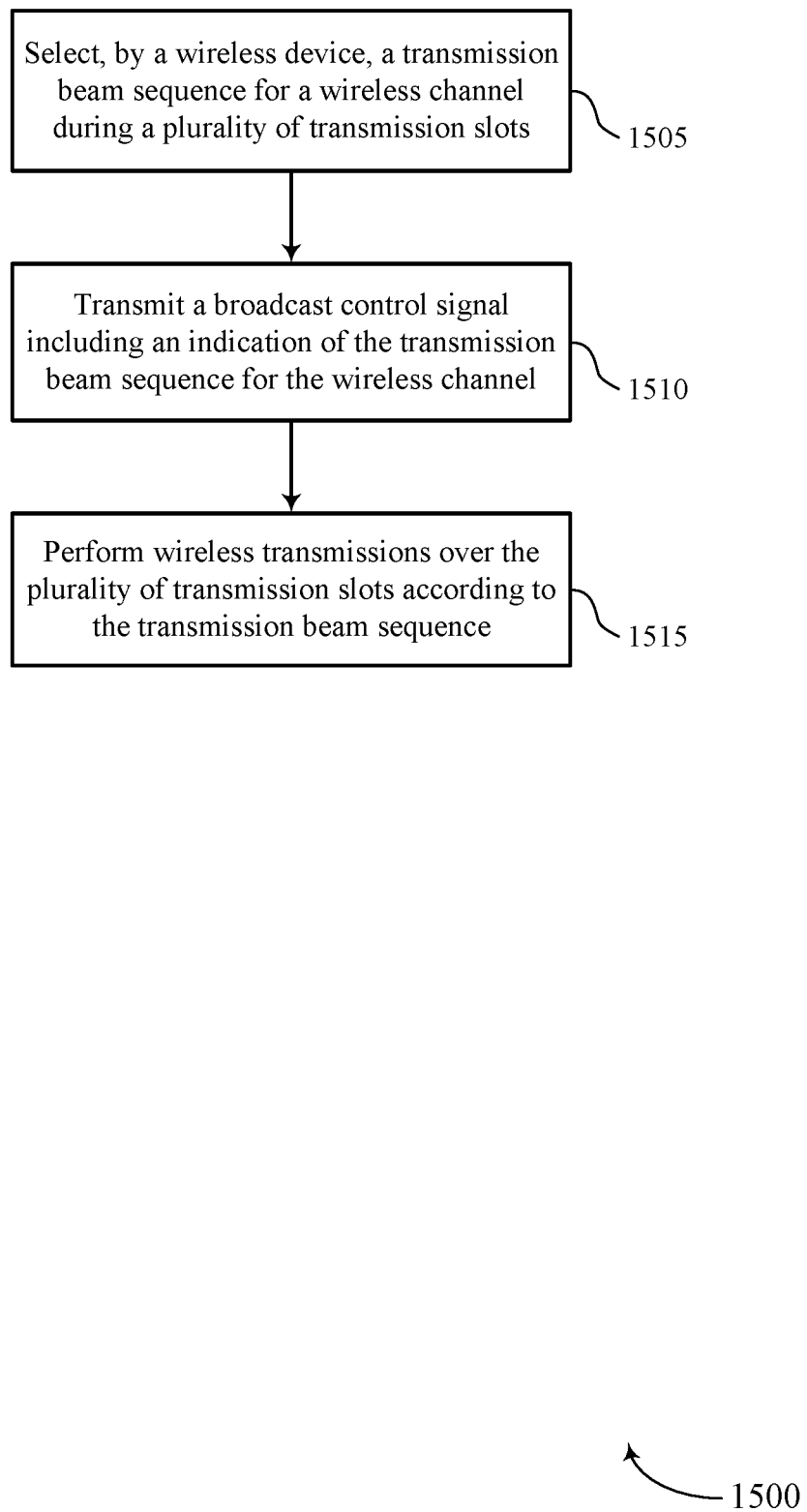
FIGS. 15 through 16 illustrate methods for bursty interference mitigation techniques in accordance with aspects of the present disclosure.

FIG. 15 shows a flowchart illustrating a method 1500 for bursty interference mitigation techniques in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1505, the base station 105 may select a transmission beam sequence for a wireless channel during a plurality of transmission slots. The operations of 1505 may be performed according to the methods described herein. In certain examples, aspects of the operations of 1505 may be performed by a beam sequence selector as described with reference to FIGS. 7 through 10.

At 1510, the base station 105 may transmit a broadcast control signal including an indication of the transmission beam sequence for the wireless channel. The operations of 1510 may be performed according to the methods described herein. In certain examples, aspects of the operations of 1510 may be performed by a broadcast signal transmission unit as described with reference to FIGS. 7 through 10.

At 1515, the base station 105 may perform wireless transmissions over the plurality of transmission slots according to the transmission beam sequence. The operations of 1515 may be performed according to the methods described herein. In certain examples, aspects of the operations of 1515 may be performed by a wireless transmission performance unit as described with reference to FIGS. 7 through 10.

Figure 16:
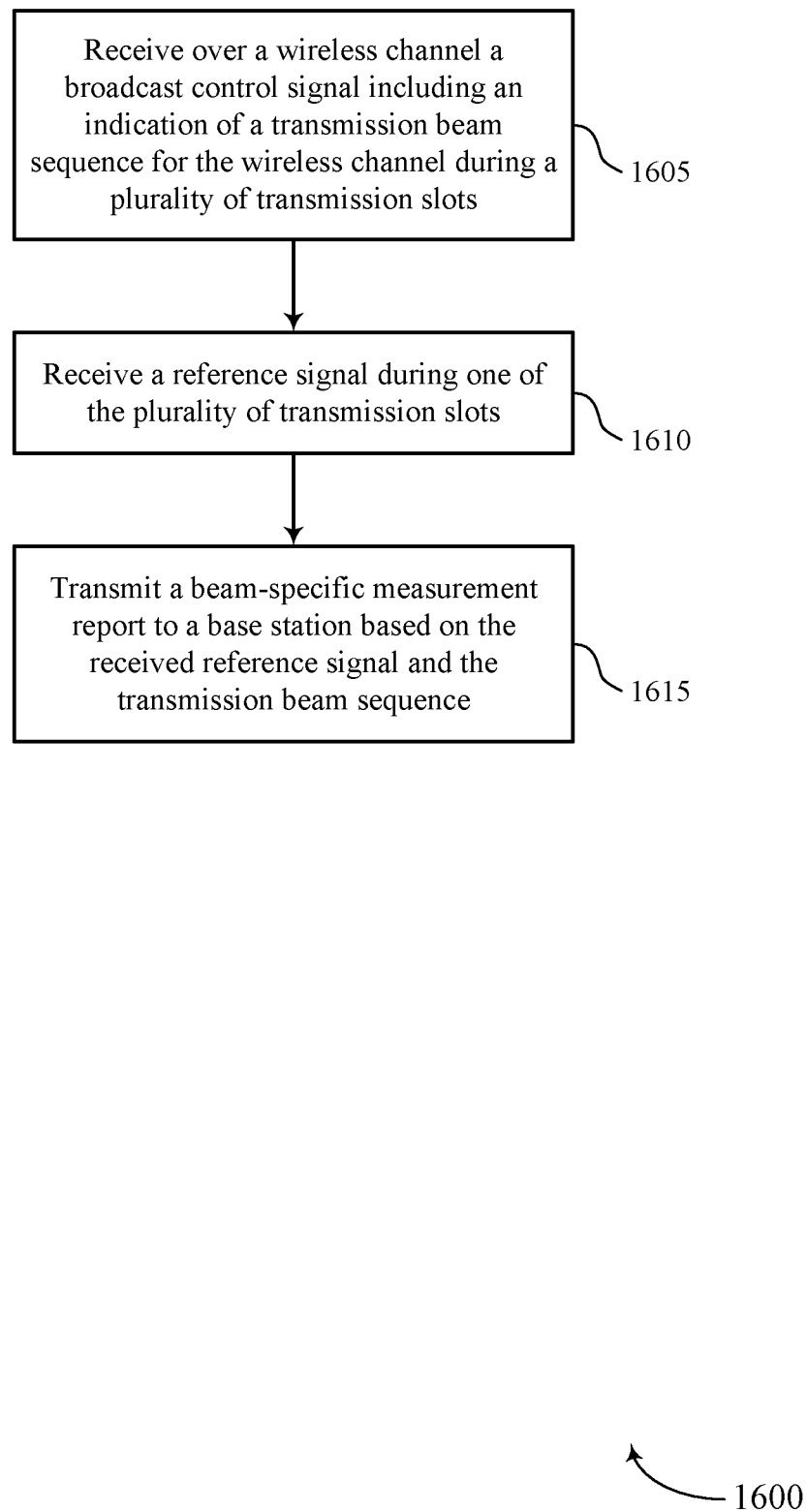

FIG. 16 shows a flowchart illustrating a method 1600 for bursty interference mitigation techniques in accordance with aspects of the present disclosure. The operations of method 1600 may be implemented by a UE 115 or a UE 210, or its components as described herein. For example, the operations of method 1600 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may receive over a wireless channel a broadcast control signal including an indication of a transmission beam sequence for the wireless channel during a plurality of transmission slots. The operations of 1605 may be performed according to the methods described herein. In certain examples, aspects of the operations of 1605 may be performed by a broadcast control signal processor as described with reference to FIGS. 11 through 14.

At 1610, the UE 115 may receive a reference signal during one of the plurality of transmission slots. The operations of 1610 may be performed according to the methods described herein. In certain examples, aspects of the operations of 1610 may be performed by a reference signal processor as described with reference to FIGS. 11 through 14.

At 1615, the UE 115 may transmit a beam-specific measurement report to a base station 105 based at least in part on the received reference signal and the transmission beam sequence. The operations of 1615 may be performed according to the methods described herein. In certain examples, aspects of the operations of 1615 may be performed by a measurement report transmission unit as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 or UEs 210 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 or UEs 210 with service subscriptions with the network provider. A femto cell may also cover a small geographic area (e.g., a home) and may provide restricted access by UEs 115 or UEs 210 having an association with the femto cell (e.g., UEs 115 or UEs 210 in a closed subscriber group (CSG), UEs 115 or UEs 210 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    selecting, by a wireless device, a transmission beam sequence for a wireless channel during a plurality of transmission slots;
    transmitting a broadcast control signal comprising an indication of the transmission beam sequence for the wireless channel;
    performing wireless transmissions over the plurality of transmission slots according to the transmission beam sequence, the performing including transmitting a reference signal over the wireless channel during one of the plurality of transmission slots based at least in part on the transmission beam sequence;
    receiving a beam-specific measurement report for the wireless channel based at least in part on the reference signal and the transmission beam sequence;
    receiving a negative acknowledgement (NACK) corresponding to the reference signal; and
    freezing an outer loop link adaptation procedure based at least in part on receiving the NACK.

2. The method of claim 1, wherein the beam-specific measurement report comprises an indication of interference on a first transmission beam.

3. The method of claim 2, wherein the indication of interference on the transmission beam comprises a clean tag.

4. The method of claim 2, further comprising:
    selecting a second beam sequence based at least in part on the indication of interference on the transmission beam.

5. The method of claim 2, further comprising:
    performing a first outer loop link adaptation procedure corresponding to a first state of the indication of the beam-specific measurement report; and
    performing a second outer loop link adaptation procedure corresponding to a second state of the indication of the beam-specific measurement report;
    wherein freezing the outer loop link adaptation procedure based at least in part on receiving the NACK comprises freezing one or more of the first outer loop adaptation procedure or the second outer loop adaptation procedure.

6. The method of claim 2, further comprising:
    performing a first rank adaptation procedure corresponding to a first state of the indication of the beam-specific measurement report; and
    performing a second rank adaptation procedure corresponding to a second state of the indication of the beam-specific measurement report;
    wherein freezing the outer loop link adaptation procedure based at least in part on receiving the NACK comprises freezing one or more of the first rank adaptation procedure or the second rank adaptation procedure.

7. The method of claim 1, wherein the outer loop link adaptation procedure comprises a rank adaptation procedure.

8. The method of claim 1, wherein the transmission beam sequence comprises an indication of a transmission beam to be used in each of the plurality of transmission slots.

9. The method of claim 8, wherein the indication of the transmission beam comprises a beam index for the transmission beam.

10. The method of claim 8, wherein the indication of the transmission beam comprises a closest synchronization signal block index to the transmission beam.

11. The method of claim 8, wherein the broadcast control signal is transmitted after a first plurality of slots of the plurality of transmission slots and before a second plurality of slots of the plurality of transmission slots.

12. The method of claim 1, wherein the broadcast control signal is transmitted on a group common physical downlink control channel (GC PDCCH).

13. The method of claim 1, wherein selecting the transmission beam sequence comprises:
    selecting a first transmission beam;
    scheduling transmissions on the first transmission beam for at least a threshold number of consecutive transmission slots of the plurality of transmission slots;
    selecting a second transmission beam different from the first transmission beam; and
    scheduling transmissions on the second transmission beam for at least the threshold number of consecutive transmission slots of the plurality of transmission slots after the transmission slots scheduled for transmissions on the first transmission beam.

14. The method of claim 13, further comprising:
    determining that the wireless channel is a minimum dwell channel, wherein transmissions are scheduled on the first transmission beam for at least the threshold number of consecutive transmission slots of the plurality of transmission slots based at least in part on the determining.

15. The method of claim 13, wherein scheduling transmissions on the first transmission beam for at least the threshold number of consecutive transmission slots comprises:
    refraining from scheduling any transmissions on the wireless channel during one of the at least the threshold number of consecutive transmission slots.

16. The method of claim 13, further comprising:
    selecting a modulation and coding scheme (MCS) based at least in part on the scheduling transmissions on the first transmission beam for at least the threshold number of consecutive transmission slots.

17. The method of claim 1, wherein selecting the transmission beam sequence comprises:

scheduling a first wireless transmission on a first transmission beam during a first transmission slot of the plurality of transmission slots; and refraining from scheduling additional transmissions on the first transmission beam for at least a threshold number of slots after the first transmission slot.

18. The method of claim 17, further comprising:

determining that the wireless channel is a minimum revisit channel, wherein the additional transmissions are refrained from being scheduled on the first transmission beam for at least the threshold number of slots after the first transmission slot based at least in part on the determining.

19. A method for wireless communication, comprising:

receiving over a wireless channel a broadcast control signal comprising an indication of a transmission beam sequence for the wireless channel during a plurality of transmission slots;

receiving a reference signal during one of the plurality of transmission slots;

transmitting a beam-specific measurement report to a base station based at least in part on the received reference signal and the transmission beam sequence, the beam-specific measurement report comprising a reported channel quality indicator (CQI) for a transmission beam corresponding to the reference signal;

determining a classification of an interference state of the reported CQI; and transmitting a negative acknowledgement (NACK) based at least in part on determining that the reference signal was not received, the NACK comprising the classification.

20. The method of claim 19, further comprising:

determining a current CQI for the transmission beam;

determining one or more previous CQIs for the transmission beam; and calculating an average CQI for the transmission beam based at least in part on the current CQI and the one or more previous CQIs, wherein the average CQI is used as the reported CQI.

21. The method of claim 19, wherein the classification is one of a clean CQI and an unclean CQI.

22. The method of claim 19, further comprising:

determining, based at least in part on the indication of the transmission beam sequence, that wireless transmissions are scheduled on a first transmission beam for a number of consecutive transmission slots; and filtering channel state information over the number of consecutive transmission slots.

23. An apparatus for wireless communication, comprising:

a processor;

memory in electronic communication with the processor; and instructions stored in the memory, wherein the instructions are executable by the processor to:

select, by a wireless device, a transmission beam sequence for a wireless channel during a plurality of transmission slots;

transmit a broadcast control signal comprising an indication of the transmission beam sequence for the wireless channel;

perform wireless transmissions over the plurality of transmission slots according to the transmission beam sequence;

transmit a reference signal over the wireless channel during one of the plurality of transmission slots based at least in part on the transmission beam sequence;

receive a beam-specific measurement report for the wireless channel based at least in part on the reference signal and the transmission beam sequence;

receive a negative acknowledgement (NACK) corresponding to the reference signal; and freeze an outer loop link adaptation procedure based at least in part on receiving the NACK.

24. An apparatus for wireless communication, comprising:

a processor;

memory in electronic communication with the processor; and instructions stored in the memory, wherein the instructions are executable by the processor to:

receive over a wireless channel a broadcast control signal comprising an indication of a transmission beam sequence for the wireless channel during a plurality of transmission slots;

receive a reference signal during one of the plurality of transmission slots;

transmit a beam-specific measurement report to a base station based at least in part on the received reference signal and the transmission beam sequence, the beam-specific measurement report comprising a reported channel quality indicator (CQI) for a transmission beam corresponding to the reference signal;

determine a classification of an interference state of the reported CQI; and transmit a negative acknowledgement (NACK) based at least in part on determining that the reference signal was not received, the NACK comprising the classification.

* * * * *